(12) United States Patent
Kanota et al.

(10) Patent No.: US 6,684,026 B2
(45) Date of Patent: *Jan. 27, 2004

(54) INFORMATION RECORDING METHOD AND APPARATUS AND INFORMATION RECORDING MEDIUM

(75) Inventors: Keiji Kanota, Kanagawa (JP); Shunji Okada, Kanagawa (JP); Shinichi Suenaga, Kanagawa (JP); Nobuko Fujii, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 179 days.

(21) Appl. No.: 09/150,197

(22) Filed: Sep. 8, 1998

(65) Prior Publication Data
US 2002/0071655 A1 Jun. 13, 2002

(30) Foreign Application Priority Data

| Sep. 10, 1997 | (JP) | 9-245657 |
| Sep. 11, 1997 | (JP) | 9-247330 |
| Dec. 17, 1997 | (JP) | 9-348208 |

(51) Int. Cl.[7] ............................................. H04N 5/91
(52) U.S. Cl. ................. 386/111; 386/112; 386/125
(58) Field of Search .............................. 386/46, 68, 69, 386/80, 81, 82, 95, 96, 98, 104, 111, 112, 125, 126, 33; 369/59.25

(56) References Cited

U.S. PATENT DOCUMENTS

| 5,369,441 A | * | 11/1994 | Enari .......................... 386/46 |
| 5,510,903 A | * | 4/1996 | Matsumura .................... 386/33 |
| 5,655,052 A | * | 8/1997 | Nakai et al. ................. 386/125 |
| 5,699,474 A | * | 12/1997 | Suzuki et al. .................. 386/68 |
| 5,784,518 A | * | 7/1998 | Ogura .......................... 386/68 |
| 5,798,995 A | * | 8/1998 | Fukushima et al. ........... 386/98 |
| 5,832,173 A | * | 11/1998 | Terasawa et al. ............. 386/69 |
| 5,841,939 A | * | 11/1998 | Takahashi et al. ............ 386/68 |
| 5,911,032 A | * | 6/1999 | Hirayama et al. ............. 386/95 |
| 5,949,953 A | * | 9/1999 | Shirakawa et al. ........... 386/70 |
| 5,987,417 A | * | 11/1999 | Heo et al. ..................... 386/96 |
| 5,991,502 A | * | 11/1999 | Kawakami et al. ......... 386/109 |
| 6,134,204 A | * | 10/2000 | Taugher ................... 369/59.25 |
| 6,141,491 A | * | 10/2000 | Yamagishi et al. ......... 386/109 |

* cited by examiner

*Primary Examiner*—Huy Nguyen
(74) *Attorney, Agent, or Firm*—Frommer Lawrence & Haug LLP; William S. Frommer; Bruno Polito

(57) ABSTRACT

In an information recording device, variable-speed reproduction by software control is to be enabled. To this end, the information recording device has an HDD for recording an audio/visual digital data stream with a logical sector as an accessing unit, and an AV micro-computer system 10. This AV micro-computer system 10 has, as a recording data unit, a fixed length of the audio/visual digital data stream corresponding to an integer number multiple of a frame length. The AV micro-computer system 10 allocates the recording data unit to a minimum number of the logical sectors that can record the recording data unit in its entirety, while stuffing dummy data in the remaining portion of a logical sector of the digital data stream.

20 Claims, 19 Drawing Sheets

|  | MSB |  |  |  |  |  |  | LSB |
|---|---|---|---|---|---|---|---|---|
| PC 0 | 0 | 1 | 0 | 1 | 0 | 0 | 0 | 1 |
| PC 1 | CGMS | | ISR | | CMP | | SS | |
| PC 2 | REC ST | REC END | REC MODE | | | INSERT CH | | |
| PC 3 | DRF | SPEED | | | | | | |
| PC 4 | 1 | GENRE CATEGORY | | | | | | |

FIG.21

|  | MSB |  |  |  |  |  |  | LSB |
|---|---|---|---|---|---|---|---|---|
| PC 0 | 0 | 1 | 1 | 0 | 0 | 0 | 0 | 1 |
| PC 1 | CGMS | | ISR | | CMP | | SS | |
| PC 2 | REC ST | 1 | REC MODE | | 1 | DISP | | |
| PC 3 | FF | FS | FC | IL | ST | SC | BCSYS | |
| PC 4 | 1 | GENRE CATEGORY | | | | | | |

FIG.22

INFORMATION RECORDING METHOD AND APPARATUS AND INFORMATION RECORDING MEDIUM

BACKGROUND OF THE INVENTION

1. Field of the Invention

This invention relates to an information recording method and apparatus for recording an audio and/or visual digital data stream on a disc-shaped recording medium, and a recording medium.

2. Description of the Related Art

Since a hard disc drive has evolved as a peripheral of a personal computer, technical improvement in the hard disc drive has been mainly directed to having access to so-called discrete text data at random with high reliability as promptly as possible.

In keeping up with recent progress in multimedia, there has arisen a need for an HDD and a host system which allow for inexpensive construction of a so-called AV HDD system, whereby an audio visual (AV) digital data stream of, for example, the digital video (DV system SD) standard with a transfer rate of 28.6 Mbps, or the MPEG 2 (Moving Picture Experts Group 2) with the maximum transfer rate of 15 Mbps, as well as random access data other than the AV digital stream, can be handled at will on the disc.

There lacks up to now an information recording device which takes into account variable speed reproduction in case of recording an AV digital data stream, in particular a compressed AV digital data stream, on the disc-shaped recording medium.

Thus, it has been desired to be able to record data so that, by exploiting the properties of the disc-shaped recording medium of reading/writing data in terms of a logical sector as a unit, variable speed reproduction can be readily realized solely by the host-side application software when recording/reproducing the AV digital data stream.

As recording/reproducing medium for an AV digital data stream, a magnetic recording tape is in widespread use. For realizing various sorts of variable-speed reproduction on the AV digital data stream recorded on a tape, control by different types of the hardware is required for reproduction at respective variable speeds.

Thus, for realizing reproduction at various variable speeds, it is indispensable to design the hardware control devices from the outset, such that, in the AV data recording/reproducing apparatus, it has been difficult, in view of the time needed in development, circuit scale or cost to realize the function of optionally varying the variable playback speeds or of continuously varying the variable playback speed.

SUMMARY OF THE INVENTION

It is therefore an object of the present invention to provide an information recording method and apparatus and a recording medium in which an AV digital data stream, for example, can be recorded on a disc-shaped recording medium, such as HDD, such as to cope with variable-speed reproduction of the recorded data stream.

It is another object of the present invention to provide a reproducing method and apparatus whereby the playback speed can be set to a continuously variable speed.

In one aspect, the present invention provides an information recording device for recording data on a recording medium having logical sectors as an accessing unit. The recording device includes inputting means for inputting data having a fixed length equal to an integer number times a frame length, and control means for allocating the input data to a predetermined number of contiguous sectors. More specifically, with the recording device of the present invention, data is recorded on the recording medium having a logical sector as an accessing unit. A fixed length of data corresponding to an integer number times the frame length is used as a recording unit. There is provided control means for allocating the recording unit to a minimum number of the logical sectors capable of recording the recording unit in its entirety.

In another aspect, the present invention provides an information recording method including inputting data having a fixed length equal to an integer number times a frame length and allocating the input data to a predetermined number of contiguous sectors. More specifically, with the information recording method of the present invention, data is recorded on a recording medium having a logical sector as an accessing unit. A fixed length of data corresponding to an integer number times the frame length is used as a recording unit. There is provided a control step for allocating the recording unit to a minimum number of the logical sectors capable of recording the recording unit in its entirety.

In yet another aspect, the present invention provides a recording medium on which data having a fixed length equal to an integer number times a frame length has been recorded by being allocated to a predetermined number of contiguous sectors. More specifically, with the recording medium of the present invention, data is recorded on the recording medium having a logical sector as an accessing unit. A fixed length of data corresponding to an integer number times the frame length is used as a recording unit. The recording data is recorded on the recording medium by being recorded in a minimum number of the logical sectors capable of recording the recording unit in its entirety.

According to the present invention, since a defined AV digital data stream can be obtained on simply sending a logical-sector-based read-command from the host side, variable-speed reproduction in AV digital data stream reproduction, such as cue-review, slow, still, fast search, fast accessing or non-linear editing, can be easily realized simply by construction of the host-side application software.

In the reproducing device of the present invention in which an AV digital data stream having a fixed length equal to an integer number times a frame length is recorded on an HDD and reproduced, data corresponding to an integer number of times of the frame length is allocated to a predetermined number of logical sectors of the HDD and data is read out from an optional first sector of the recording unit in various ways by data transfer control which is based only on software to achieve a recording/reproducing function so that the variable-speed reproducing function can be realized more easily than with the conventional method designed in order to achieve the recording/reproducing function by data transfer control by hardware.

In addition, since the variable-speed reproducing speed can be changed freely, it becomes possible to make continuous control of the variable-speed reproducing speed.

BRIEF DESCRIPTION OF THE DRAWINGS

FIG. 21 shows an AAUX data structure of used in the reproducing device.

FIG. 22 shows a VAUX data structure of used in the reproducing device.

DESCRIPTION OF THE PREFERRED EMBODIMENTS

Figure 1:
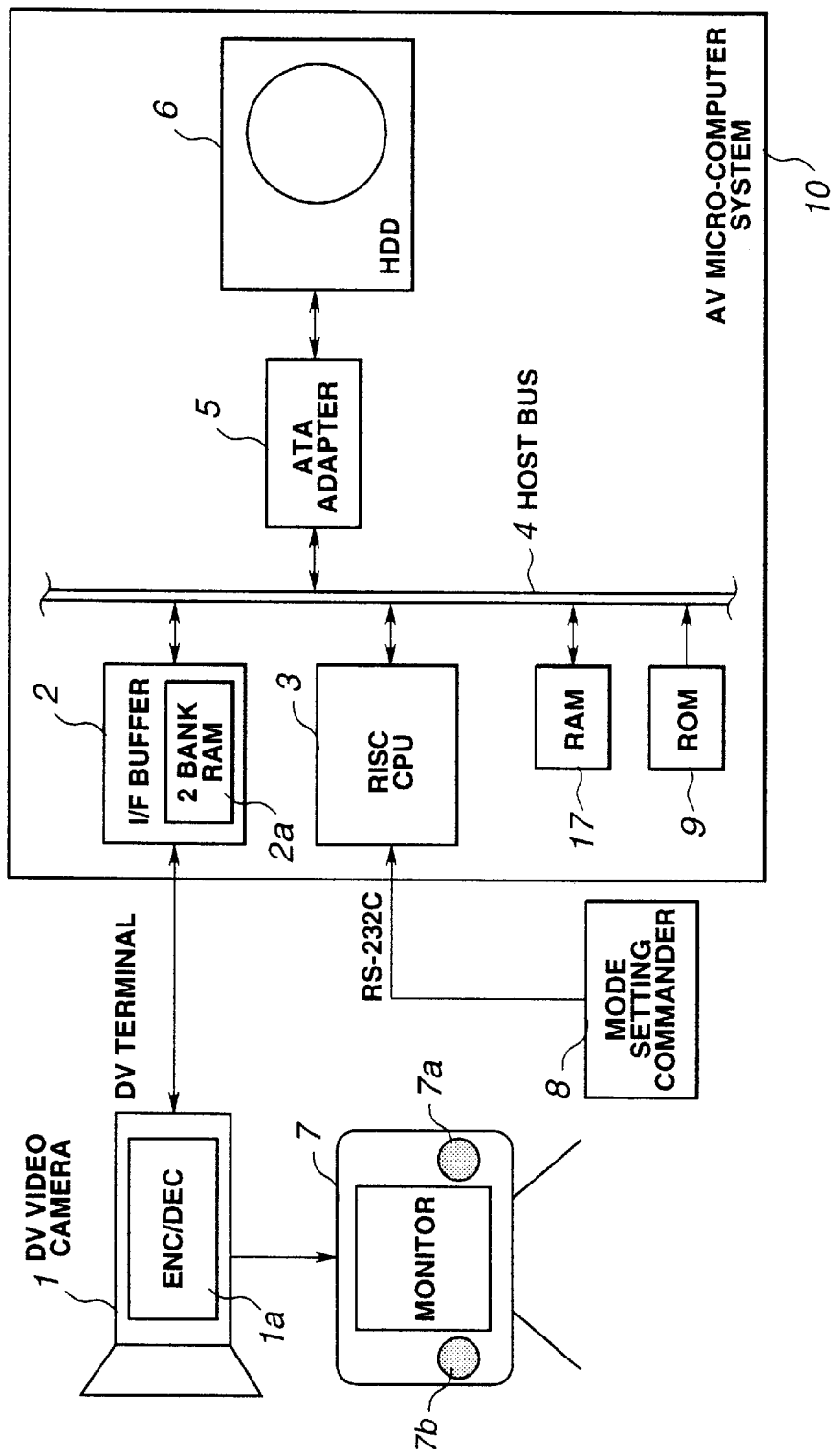
FIG. 1 is a block diagram showing an illustrative structure of an information recording device according to the present invention.

Referring to the drawings, an information recording method, an information recording device and a recording medium according to the present invention will be explained in detail.

The information recording device is a disc camera system having a DV video camera 1 for routing an imaged picture of an object as DV signals, such as DCR-TRV7 manufactured by SONY CORPORATION, a video camera conforming to the DV standard, an AV micro-computer system 10 for processing the DV signals received from the DV video camera 1, a mode setting commander 8 for commanding mode setting to a RISC CPU 3 of the AV micro-computer system 10 and a monitor 7 for monitoring a picture of the DV video camera 1, as shown in FIG. 1.

The DV video camera 1 is a camera for imaging an object by an optical system such as a lens or a CCD and for encoding the resulting picture signals by an encoder/decoder 1*a* to output the resulting signals at a DV terminal.

The AV micro-computer system 10 includes a host bus 4, as a common bus for information transmission, an interface buffer 2 for arbitrating information transmission between the DV video camera 1 and the host bus 4, an HDD 6 on which to record the information, and a so-called ATA (AT attachment) adapter 5 for arbitrating information transmission between the host bus 4 and the HDD 6.

The host bus 4 is a parallel-line transmission line for information transmission between various parts of the AV micro-computer system 10.

The interface buffer 2 arbitrates transmission of the audio and/or visual digital data stream (AV digital data stream) between the DV video camera 1 and the host bus 4. For example, the interface buffer 2 converts the transmission speed for the AV digital data stream or adjusts the transfer timing. This interface buffer 2 has an internal two-bank RAM 2*a* composed of two RAMs alternately switched to adjust the information transmission.

The HDD 6 is a fixed disc device for recording an input digital data stream thereon. The recording format on the HDD 6 will be explained subsequently. The ATA adapter 5 is interposed between the host bus 4 and the HDD 6 for converting the AV digital data stream from the parallel data for the host bus 4 to data of the data format for the HDD 6.

The AV micro-computer system 10 includes a RISC CPU 3, a central processing unit for concentrated information processing, a RAM 17 as a volatile memory and a ROM 9 as a non-volatile memory.

The RISC CPU 3 is connected to the host bus 4 to control a series of operations of the information recording method in the present AV micro-computer system 10. This series of operations are recorded on, for example, the ROM 9, so as to be occasionally read out for execution. The "RISC" means a reduced-instruction-set computer in which basic instructions controlling the CPU are simplified to reduce the instructions to improve the processing speed.

The RAM 17 is a volatile memory connected to the host bus 4 to store data therein temporarily. The ROM 9 is a non-volatile memory connected to the host bus 4 and has a predetermined program or the like stored therein. In this ROM 9 is recorded a control code concerning a series of operations of the information processing method.

The monitor 7 has a display screen and a speaker 7*a* and outputs the picture and the speech acquired by the DV video camera 1. To this monitor 7 are outputted the picture and the speech recorded on the AV micro-computer system 10 via the DV video camera 1 or reproduced by the AV micro-computer system 10.

The flow of an input signal at the recording time is explained. First, the picture signals converted by the DV video camera 1 into video electrical signals are encoded by high efficiency encoding by the encoder/decoder 1*a* taking charge of video compression. The audio data is multiplexed to form an AV digital data stream composed of DIF blocks defined in the DV system. The AV digital data stream is defined as standards by three specifications, namely the standard definition (SD), high-compression SD and high definition (HD) adapted for coping with high-definition television (HDTV).

The SD specifications provide for compression of a frame of the data stream at a fixed length of 119.2 kByte. The high-compression SD specifications provide for a frame being of 59.6 kByte while the HD specifications provide for a frame being of 238.4 kByte.

This AV digital data stream is sent via the interface buffer 2 to the host bus 4 to which is connected the RISC CPU 3. The AV digital data stream, sent to the host bus 4, has data transmission controlled by the software of the RISC CPU 3 and is written on the HDD 6 on the sector basis via the ATA adapter 5.

Figure 2:
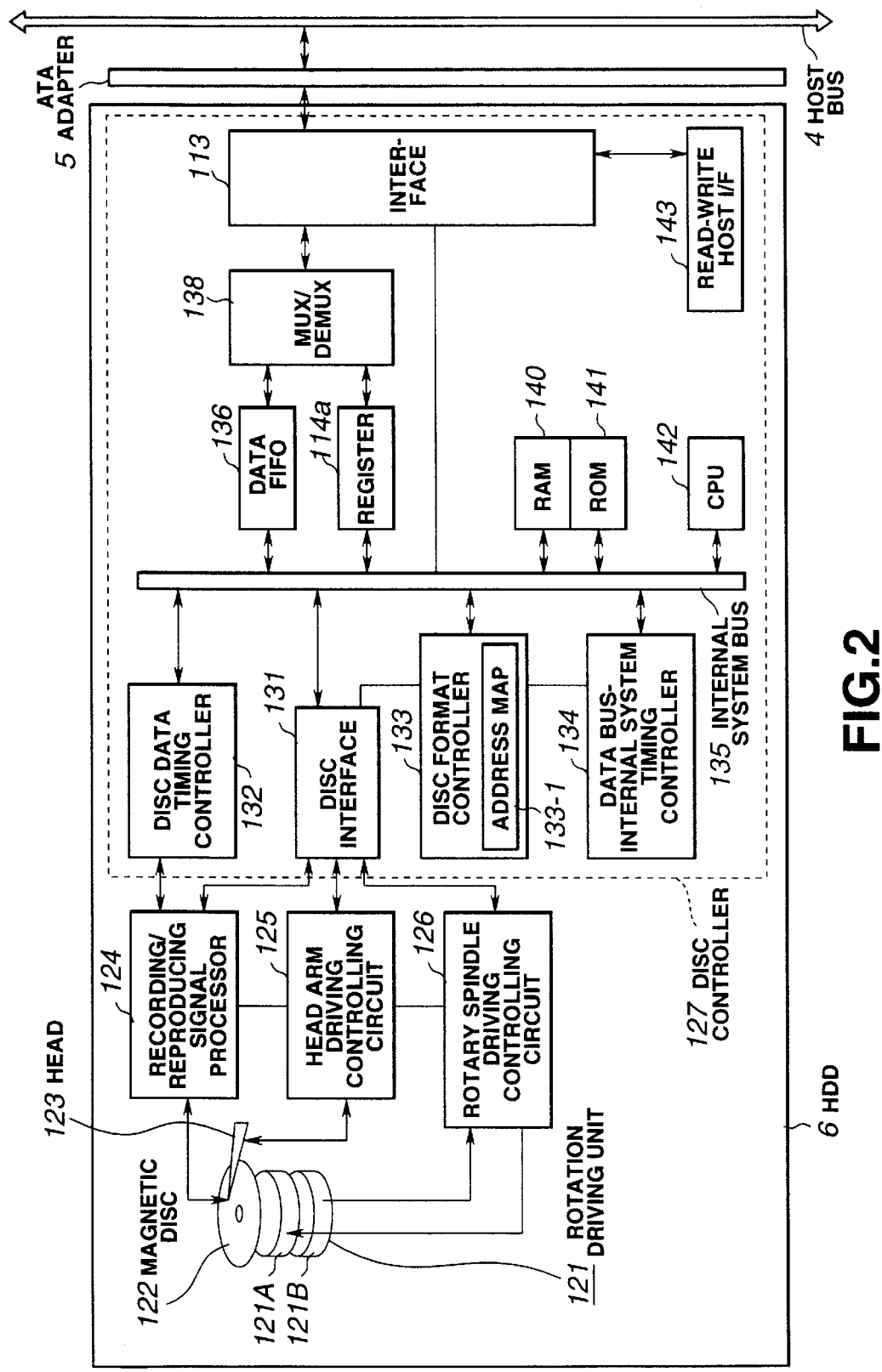
FIG. 2 is a block diagram showing an illustrative structure of an HDD of the information recording device according to the present invention.

Referring to FIG. 2, the structure of the HDD 6 provided on the information processing device is explained.

A rotational driving unit 121 is made up of a spindle motor 121A and a sensor 121B adapted for detecting its rotational speed, and is configured for rotating a magnetic disc 122 (storage means). A head portion 123 is configured for writing recording signals on the magnetic disc 11 and for reading out signals recorded on the magnetic disc 122.

During recording, a recording/reproducing signal processing circuit 124 performs channel coding (recording encoding) on the recording signals written on the magnetic disc 122 during recording, while performing conversion reversed from that during recording on the playback signals read out from the magnetic disc 122 during reproduction to execute error detection and error correction. A head arm driving control circuit 125 controls an arm supporting the magnetic head for moving the magnetic head to a predetermined track position of the magnetic disc 122. A rotary spindle driving control circuit 126 drive-controls the spindle motor 121A of the rotational driving unit 121.

A disc controller 127 controls the recording/reproducing signal processing circuit 124, head arm driving control circuit 125 and the rotary spindle driving control circuit 126. A disc interfacing unit 131 constituting the disc controller 127 performs interfacing processing between the recording/reproducing signal processing circuit 124, head arm driving control circuit 125 and the rotary spindle driving control circuit 126 on one hand and a disc format controller 133 and an internal system bus on the other.

The disc format controller 133 performs address map control, in accordance with an address map unit 133-1 holding on memory an address map of data on the magnetic disc 122, while also performing formatting of the magnetic disc 122. A disc data timing control circuit 132 routes clock signals corresponding to the rotational speed to the recording/reproducing signal processing circuit 124. A data bus internal system timing controller 134 routes clock signals to other components of the disc controller 127.

A multiplexer/demultiplexer 138 multiplexes data supplied via a data FIFO 136 and a command from a register 114a to route the multiplexed data to the ATA adapter 5 or demultiplexes external data sent via the ATA adapter 5 into data and a register command.

The data FIFO 136 is configured for sequentially holding on memory data supplied from the multiplexer/demultiplexer 138, outputting the data in the sequence it is held on memory to an internal system bus 135, sequentially holding on memory data sent from the internal system bus 135 and for sending the data held on memory to the multiplexer/demultiplexer 138. The register 114a is configured for holding on memory a command or the status received from the multiplexer/demultiplexer 138, outputting the command or status to the internal system bus 135 and for holding on memory the command or the status sent from the internal system bus 135 for sending the command or status to the multiplexer/demultiplexer 138.

The CPU 142 is configured for controlling different parts in accordance with the control program stored in the ROM 141 to record/reproduce data, control the driving of the driving system and to perform communication control between it and the host computer in dependence upon various disc parameters, commands for execution or the states of execution. The RAM 140 is configured for holding on memory data required for processing by the CPU 142 and other data.

When fed via interface 113 with data from outside and a recording command, the multiplexer/demultiplexer 138 separates the data from the recording command to send the data to the data FIFO 136 and to send the command and the status to the register 114a. If a data reproducing command is sent from outside via interface 113, the command is routed to the register 114a. A read/write host interface 143 performs interfacing processing with respect to the host.

Figure 3:
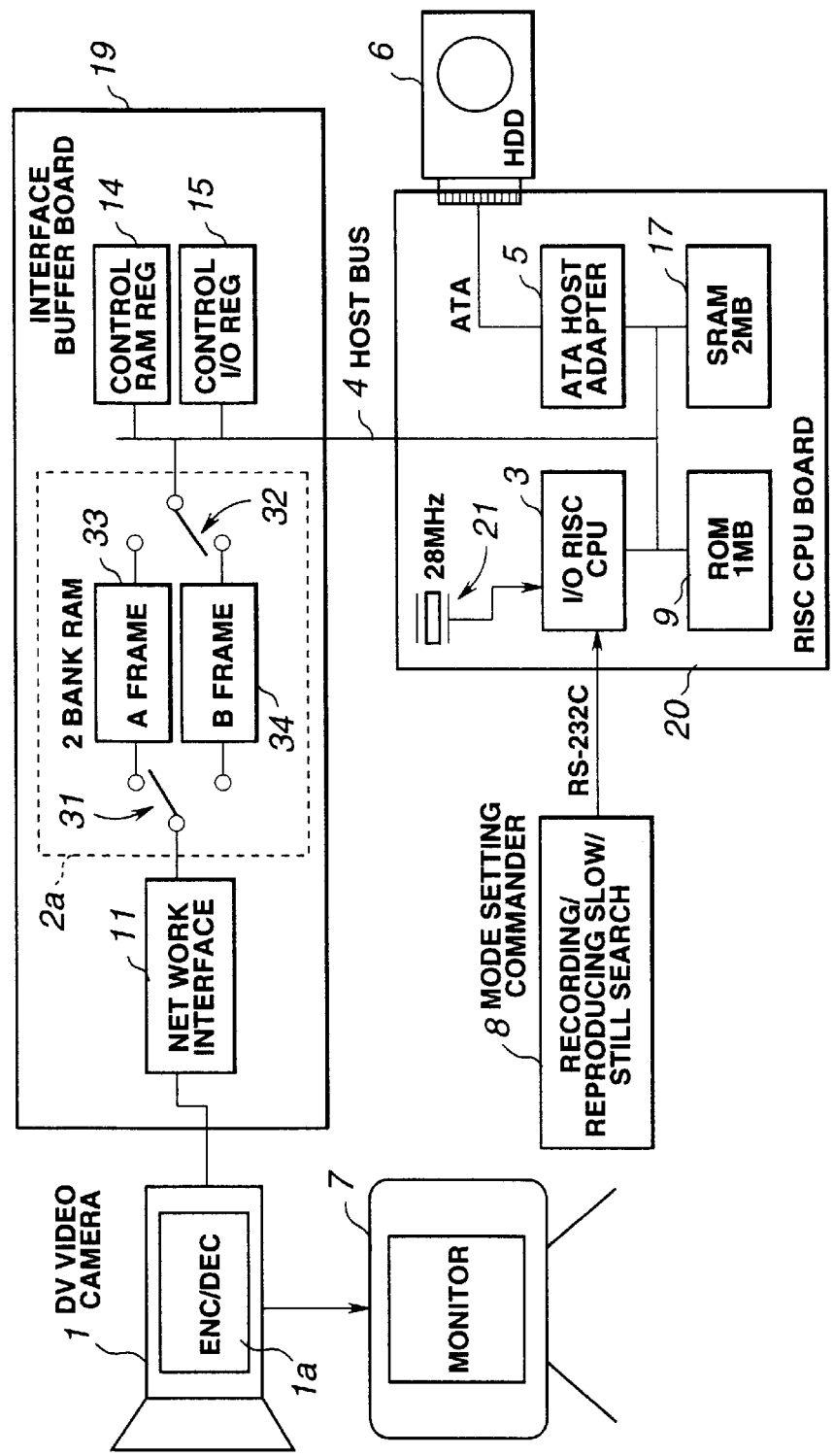
FIG. 3 is a block diagram showing an illustrative structure of a practical information recording device according to the present invention.

A specified example of the information recording device is explained with reference to FIG. 3. In this specified example, the block of the AV micro-computer system 10 in the information recording device of FIG. 1 is split into an interface buffer board 19 and an RISC CPU board 20. The inner structures of the interface buffer board 19 and the RISC CPU board 20 are shown in more detail in FIG. 3.

The interface buffer board 19 has a network interface 11 for interfacing with respect to the network and a two-bank RAM 2a for adjusting data transfer. The interface buffer board 19 and the RISC CPU board 20 are interconnected via host bus 4.

The network interface 11 is connected to the network from the DV video camera 1 and to the two-bank RAM 2a for interfacing data entered via the network. The two-bank RAM 2a has its one end and its other end connected to the network interface 11 and to the host bus 4, respectively. The first RAM 33 and the second RAM 34 of the two-bank RAM 2a are changed over by a first changeover switch 31 and a second switch 32 to permit alternate writing and readout in order to adjust data transmission.

The interface buffer board 19 has a control RAM register 14 for controlling each RAM and a control I/O register 15 for controlling the I/O.

Th control RAM register 14 and the control I/O register 15 are volatile registers connected to the host bus 4 for transient data storage.

The RISC CPU board 20 has an RISC CPU 3, which is a CPU having a reduced set of instructions, a ROM 9, which is a non-volatile memory, and an SRAM 17, which is a volatile memory. The RISC CPU 3, ROM 9 and the SRAM 17 are connected to the host bus 4.

The ROM 9 may, for example, be a product by IBM. The SRAM 17 is a RAM which holds data, once written until power down, and which therefore is not in need of re-writing. The ROM may be of a capacity of, for example, 2 MB.

The RISC CPU board 20 has an ATA adapter 5, an HDD 6 and a quartz oscillator 21.

The ATA adapter 5, known as IDE, is an interface for directly coupling the host bus 4 to the HDD 6. The ATA adapter 5 and the HDD 6 are interconnected by an ATA standard system known as enhanced intelligent drive electronics (EIDE), as prescribed by American National Standards Institute (ANSI). This EIDE is an IDE-compatible interface and has a mode of each data transfer rate, with the maximum transfer rate being 33 Mbyte/sec. For example, the data transfer mode of 13.3 Mbyte/sec suffices.

The EIDE has, in sector addressing to all data sectors on the disc, a system of accessing to the sectors with the logical block number (LBA), by handling all data sectors as logical blocks, in addition to the system of accessing the sectors with the numbers of the cylinder/header/sector as conventionally.

The HDD 6 is a fixed disc device for recording the AV digital data stream and may, for example, be a 3.5-inch HDD having a disc diameter of 3.5 inch.

The quartz oscillator 21 is an oscillator furnishing reference signals of a pre-set frequency. In the drawing, the quartz oscillator 21 is shown to generate reference signals of 28 MHz which is sent to the RISC CPU 3.

The present embodiment is directed to recording/reproducing AV digital data under control by the ATA protocol using the hard disc having an ATA system interface. The circuit structure of the ATA adapter 5 interconnecting the RISC CPU and the hard disc having the ATA system interface, under generation of address signals dedicated to the ATA device, as required in the ATA protocol, accessing wait control signal, interrupt signal and the data byte buffer control signals, is briefly explained with reference to FIG. 4.

The ATA adapter 5 of the present embodiment uses an external vector interrupt system in order to permit plural devices to the host bus 4 of the CPU.

The ATA adapter 5 has, in its inside, a first ATA interface 101 and a second ATA interface 111. The first ATA interface 101 has, in its inside, an address decoding circuit 102, an access waiting unit 104 and a bidirectional buffer 103.

The first ATA interface 101 is fed from an address bus 4a of the host bus 4 with address data having 32-bit equivalent full-address data in order to make selection 102a, selection 102b and selection 102c in an enclosed address decoding circuit 102. The selection 102a selects an ATA interface address, while the selection 102b selects an ATA data address of word data of a 16-bit length and the selection 102c selects the ATA register address of the 8-bit register setting data.

From thee address decoding data, various control signals are generated and accorded to the ATA connector interface of the hard disc. The inputs from the CPU are an address signal equivalent to 32 bits, READ and WRITE control signals of the CPU, vector fetch control signals and upper and lower order bytes of 16-bit data bus width having the data bus width set by the CPU from the data buses owned by the CPU towards the ATA adapter 5.

The address signal equivalent to 32 bits means an address signal having substantially the 32-bit address information in the CPU. The address signal may include such an address signal having, for several upper order bits of the 32-bit address bus, a defined address area partial area accessing range, as an area selection address signal for selection, from the totality of accessible address maps of the CPU.

The second ATA interface 111 has, in its inside, a priority encoder 112 and an external vector generating circuit 113.

The first ATA interface 101 includes, as an input/output of ATA standard signal with respect to the hard disc, an address decoding circuit 102 for full-address-decoding the 32-bit equivalent address signal of the RISC CPU to address-select the ATA device and respective registers and a data register in the ATA device. As output address signals to the ATA device, address signal outputs CS0-, CS1- and DA[2 . . . 0], corresponding to the ADR[3 . . . 1] of the lower order address of the 32-bit equivalent host bus, address-bit-shifted by one bit, are entered to the ATA device.

The first ATA interface 101 also includes an access waiting circuit 104 for adapting the high-processing speed RISC CPU to the timing of the ATA protocol against control input signals including, in addition to the read/write signal of IOR- and IOW- from the CPU side, an access wait request signal IORDY from the ATA device to the host CPU in the course of data transfer and an interrupt processing request signal INTRQ in the control register setting or data transfer processing flow of the disc drive in the ATA standard protocol.

The access waiting circuit 104 also includes a vector fetch control signal input for a vector fetch signal, which is a vector retrieving state control or strobe signal for generating access wait for a vector number data generating time in the external vector generating circuit 113 as later explained at the time of retrieval by the CPU of the external vector number data responsive to the external interrupt request.

As data inputs and outputs, there are provided inputs and outputs for lower order data bytes [7 . . . 0] used for reading/writing set values of the register in conformity to the ATA protocol and upper order data bytes DD-[15 . . . 8] used along with the lower order data bytes during data transfer of the 16-bit word, in relation to control block registers and command bock registers provided in the inside of the ATA standard hard disc drive.

The second ATA interface 111 is an external vector interrupt circuit and has, in its inside, a priority encoder 112 for setting the order of priority of interrupt processing to the CPU of those devices, which are subject to an interrupt request, and an external vector generating circuit 113 generating vector number data by according the priority sequence information of the device subject to interrupt requests by address data to route the generated vector number data to the CPU executing access programming by a program.

The priority encoder 112 is fed with device-based interrupt request signals to send to the CPU the priority sequence previously allocated to each interrupt inputs from the devices. The priority encoder 112 receives the interrupt request signal INTRQ from the ATA standard disc drive to encode the priority order of this disc drive to, for example, four interrupt level signals IRL0- to IRL3- to output the encoded signal to the control bus 4c of the host bus 4 so as to be retrieved in the CPU.

The external vector generating circuit 113 is also fed with a vector fetch strobe signal (status control signal) and READ signal issued by the CPU responsive to the above-mentioned mentioned interrupt level signals allocated to the devices which are subject to interrupt requests, and with the interrupt priority level number which the CPU outputs responsive to the interrupt priority signals IRL0- to IRL3- in this state after conversion in the inside of the CPU. This interrupt priority level number is entered to the lower order 4 bits of the ADR[3 . . . 0].

During the time the vector fetch strobe signal (status control signal) is issued, the lower order 4 bits of the address bus are used for the interrupt priority level number from the CPU. The external vector generating circuit 113 is fed with these two input control signals and lower-order 4 bit address input to output the external vector as byte length to the lower order 4-bit bytes of the data bus to permit the CPU to retrieve the external vector number data allocated to the selected device.

The 32-bit RISC CPU and the disc drive having the ATA system interface are interconnected in the manner as described above.

In the present embodiment, the information recording device uses a display-integrated type PC as the mode setting commander 8. As specified on the indicating board of the PC, at least the operations of "record", "playback", "slow", "still" and "search" can be performed via the mode setting commander 8.

Figure 5:
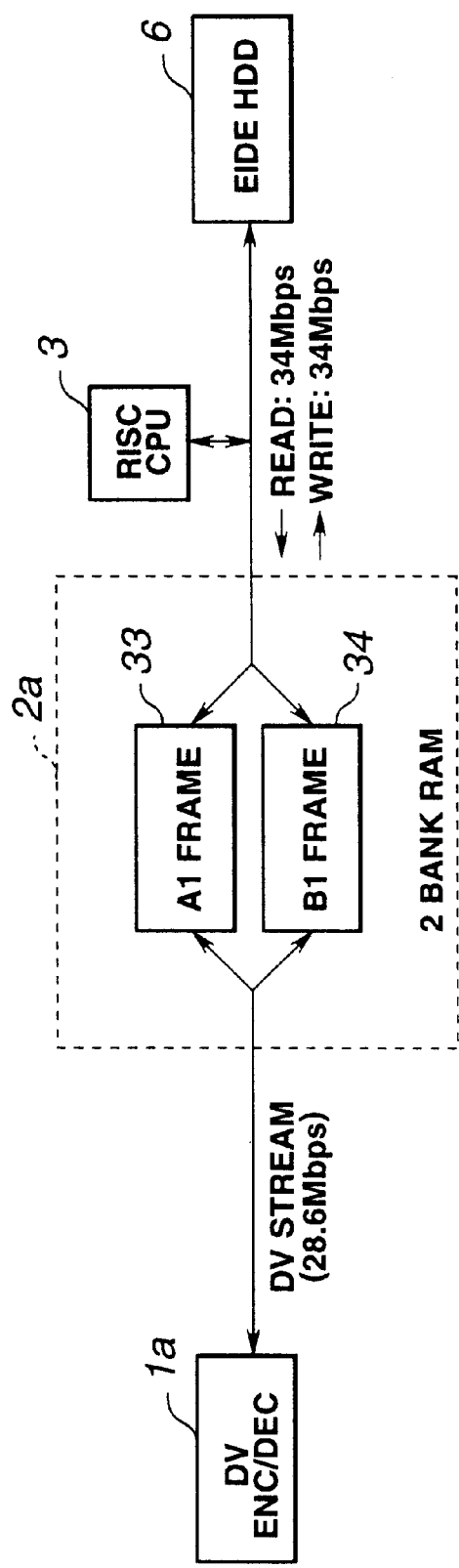
FIG. 5 illustrates an example of data flow in the information recording device according to the present invention.

The schematics of data flow in this information recording device are explained with reference to FIG. 5. The encoder/decoder 1a of the DV video camera 1 and the HDD 6 of the EIDE standard exchange the information over the network interface and the above-mentioned two-bank RAM 2a. The information transmission between the encoder/decoder 1a, network interface and the HDD 6 is controlled by the RISC CPU 3 connecting to the transmission channel between the HDD 6 and the two-bank RAM 2a.

From the encoder/decoder 1a to the two-bank RAM 2a are transferred data in the form of an AV digital data stream conforming to the IEEE1394 standard at a transfer rate of 28.6 Mbps over a network interface. The data entering the HDD 6 from the two-bank RAM 2a is transferred at the transfer rate of 34 Mbps for writing therein.

Conversely, data read from the HDD 6 is transferred to the two-bank RAM 2a at the same transfer rate of 34 Mbps as that for writing. From the two-bank RAM 2a to the encoder/decoder 1a are transferred data in the form of an AV digital data stream conforming to the IEEE1394 standard at a transfer rate of, for example, 28.6 Mbps over the network interface.

It is noted that the data transfer rate on the transmission channel between the encoder/decoder 1a, network interface and the two-bank RAM 2a differs from that on the transmission channel between the HDD 6 and the two-bank RAM 2a.

The input data rate to the HDD 6 is high and exhibits data continuity, while the input/output data to or from the network interface is not so high but exhibits higher data continuity.

The two-bank RAM 2a has two frame memories, namely a first frame memory 33 and a second frame memory 34 which are switched to perform writing and readout alternatively to adjust the difference in the data transfer rates.

That is, if data is written in a frame time interval in one of the frame memories of the two-bank RAM 2a and data is read out from the other frame memory in one frame time interval, data continuity is maintained by completing the writing and readout in and from the memories in one frame time interval, despite difference in data transfer rates or in data continuity, thus assuring continuous data transfer.

Figure 4:
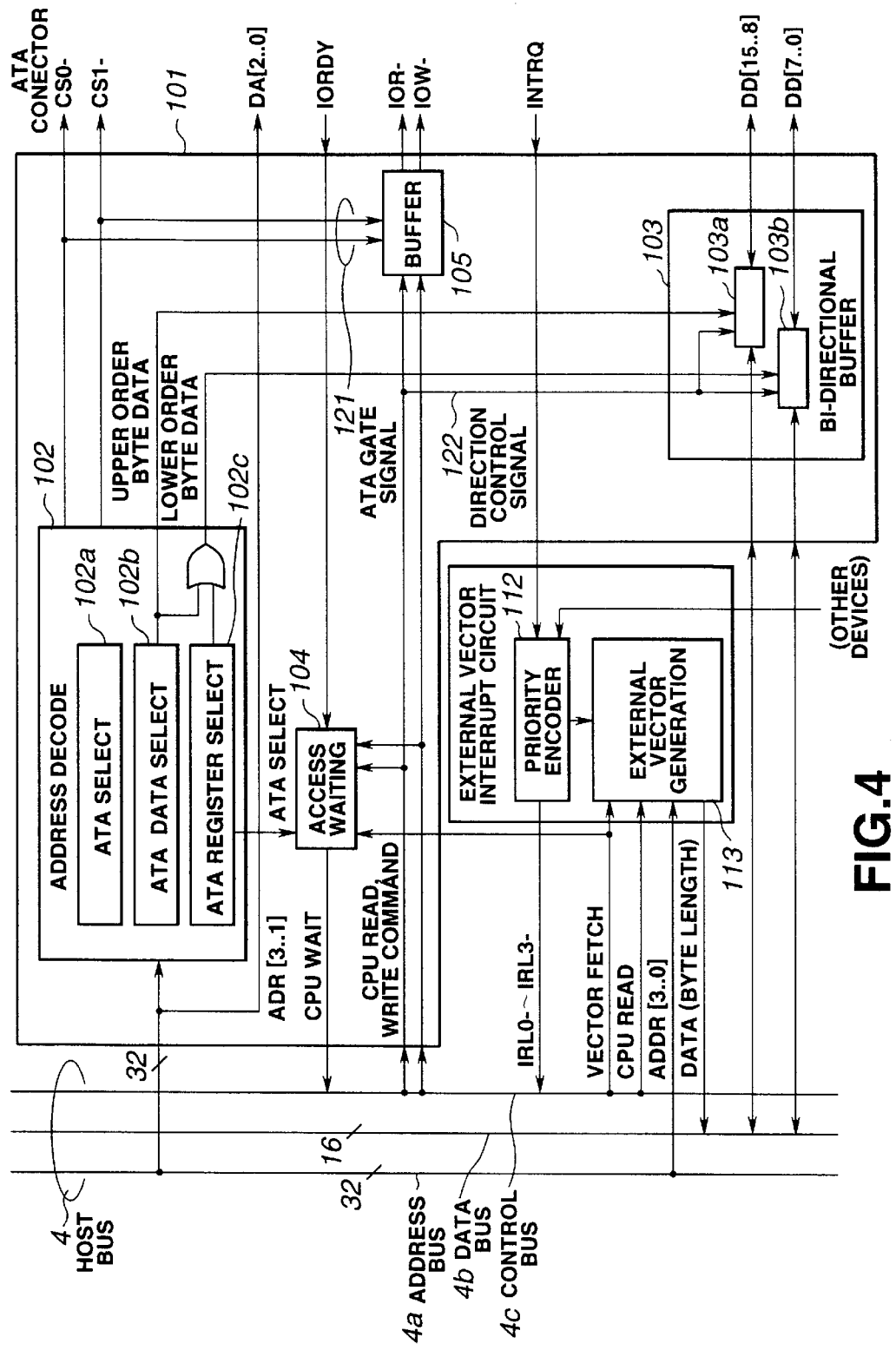
FIG. 4 is a block diagram showing an illustrative structure of an ATA adapter of the information recording device according to the present invention.

The data transfer in the two-bank RAM 2a is explained with reference to the data transfer timing diagram shown in FIG. 4.

During data readout when the information is transferred from the HDD 6 to the network interface and to the encoder/decoder 1a, data is transferred as indicated by arrow A in the two-bank RAM 2a.

In a first frame F0, data A1 is written in the first frame RAM 33, while data B0 is read from the second frame RAM 34. It is noted that data recorded in the first frame RAM 33 and in the second frame RAM 34 are indicated by index letters A and B, respectively.

The RISC CPU 3 perpetually monitors a status register, such that the CPU sets the status register to "1" and "0" when the writing of data A1 to the first frame RAM 33 comes to a close and when the data read out from the second frame RAM 34 comes to a close, respectively. Since the time required for writing the data A1 in the first frame RAM 33 is shorter than that required in reading out data B0 in the second frame RAM 34, the status register is set to "1" and 0" at a timing when the writing of the data A1 has come to a close and at a subsequent when readout of the data B0 has come to a close, respectively.

Data transfer in the two-bank RAM 2a is now explained with reference to the data transfer timing diagram of FIG. 6.

During data read time when the information is transferred from the HDD 6 to the network interface and to the encoder/decoder 1a, data is transferred in the two-bank RAM 2a as indicated at A in the drawing.

In a first frame F0, data A1 is written in the first frame RAM 33, while data B0 is read from the second frame RAM 34. It is noted that data recorded in the first frame RAM 33 and in the second frame RAM 34 are indicated by index letters A and B, respectively.

The RISC CPU 3 perpetually monitors a status register, such that the CPU sets the status register to "1" and "0" when the writing of data A1 to the first frame RAM 33 comes to a close and when the data read out from the second frame RAM 34 comes to a close, respectively. Since the time required for writing the data A1 in the first frame RAM 33 is shorter than that required in reading out data B0 in the second frame RAM 34, the status register is set to "1" and 0" at a timing when the writing of the data A1 has come to a close and at a subsequent when readout of the data B0 has come to a close, respectively.

When the status register is set to "0", the operating states of the first frame memory 33 and the second frame memory 34 are changed over such that data is read from the first frame memory 33 and written in the second frame memory 34.

Thus, in a first frame F1 subsequent to the first frame F0, the data A1 written in the first frame F0 is read out from the first frame memory 33, while the data B1 is written in the second frame memory 34.

Figure 6:
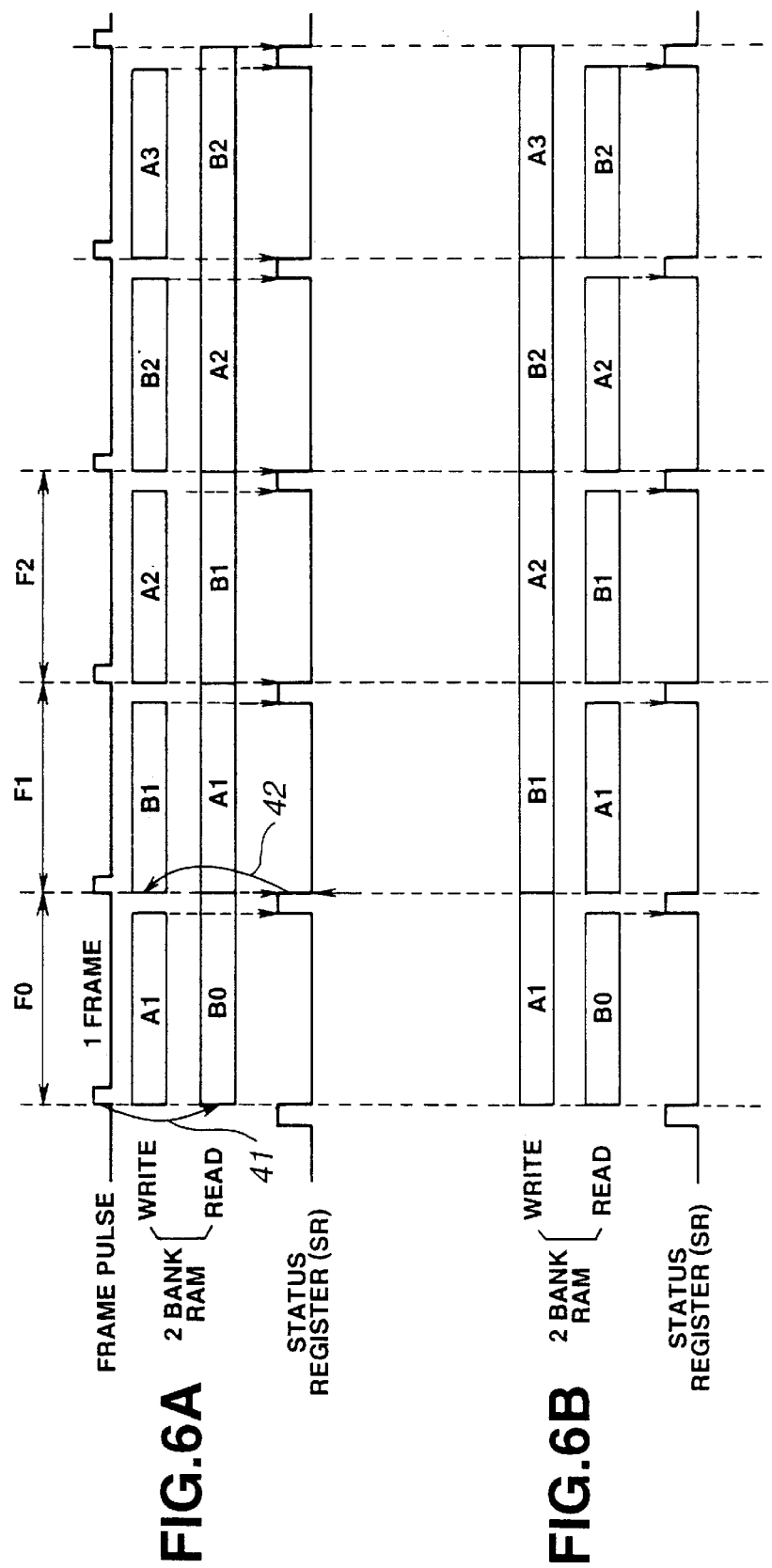
FIG. 6 illustrates data transfer timing in a 2-bank RAM in the information recording device according to the present invention.

The writing of the data B1 in the first frame memory 33 and readout of the data A1 from the second frame memory 34 are started in the "0" state of the status register at a timing when the frame pulse rises from the low level to the high level, as shown by arrow 42 in FIG. 6.

This frame pulse decays after lapse of a predetermined time as from the rising time.

At the second frame F2 subsequent to the first frame F1, the data B1 written in the first frame is read from the second frame memory 34, while the data A2 is written in the first frame memory 33.

The timing for writing and readout in the first frame F1 and in the second frame F2 is the same as that in the first frame F0.

During writing, the CPU 3 writes 19.2 KByte corresponding to a frame in the RAM, after which it sets the status register from "0" to "1". During data readout, the CPU 3 sets the status register from "1" to "0" after end of reading.

The above-mentioned frame data flow in its entirety is A0 B0, A1, B1, A2, B2, A3, B3, A4, B4, . . . . The transfer speed is changed by adjusting the read timing and the write timing of the frame data in the first frame memory 33 and the second frame memory 34 and transferring the adjusted frame data.

During writing when the information is transmitted from the encoder/decoder 1a to the HDD 6, data is transferred in the two-bank RAM 2a as indicated by arrow B.

In the first frame F0, the data A1 is written in the first frame memory 33, while the data B0 is read from the second frame memory 34.

The RISC CPU 3 perpetually monitors a status register, such that the CPU sets the status register to "1" and "0" when the readout of data B0 from the second frame 34 comes to a close and when the data writing in the first frameframe 33 comes to a close, respectively. Since the time required for reading the data B0 from the second frameframe34 is shorter than that required in writing data A1 in the first frame 34, the status register is set to "1" and 0" at a timing when the readout of the data B0 has come to a close and at a subsequent when writing of the data A1 has come to a close, respectively.

When the status register is set to "0", the operating states of the first frame memory 33 and the second frame memory 34 are changed over such that data is read from the first frame memory 33 and written in the second frame memory 34.

Thus, in a first frame F1 subsequent to the first frame F0, the data A1 written in the first frame F0 is read out from the first frame memory 33, while the data B1 is written in the second frame memory 34.

The writing of the data B1 in the first frame memory 33 and readout of the data A1 from the second frame memory 34 are started in the "0" state of the status register at a timing when the frame pulse rises from the low level to the high level, as shown by arrow 42 in FIG. 6.

This frame pulse decays after lapse of a predetermined time as from the rising time.

At the second frame F2 subsequent to the first frame F1, the data B1 written in the first frame is read from the second frame memory 34, while the data A2 is written in the first frame memory 33. The timing for writing and readout in the first frame F1 and in the second frame F2 is the same as that in the first frame F0.

During writing, the CPU 3 writes 19.2 KByte corresponding to a frame in the RAM, after which it sets the status register from "0" to "1". For data readout, the CPU 3 sets the status register from "1" to "0" after end of reading.

The format of a recording medium on which to record an AV digital data stream is hereinafter explained.

Figure 7:
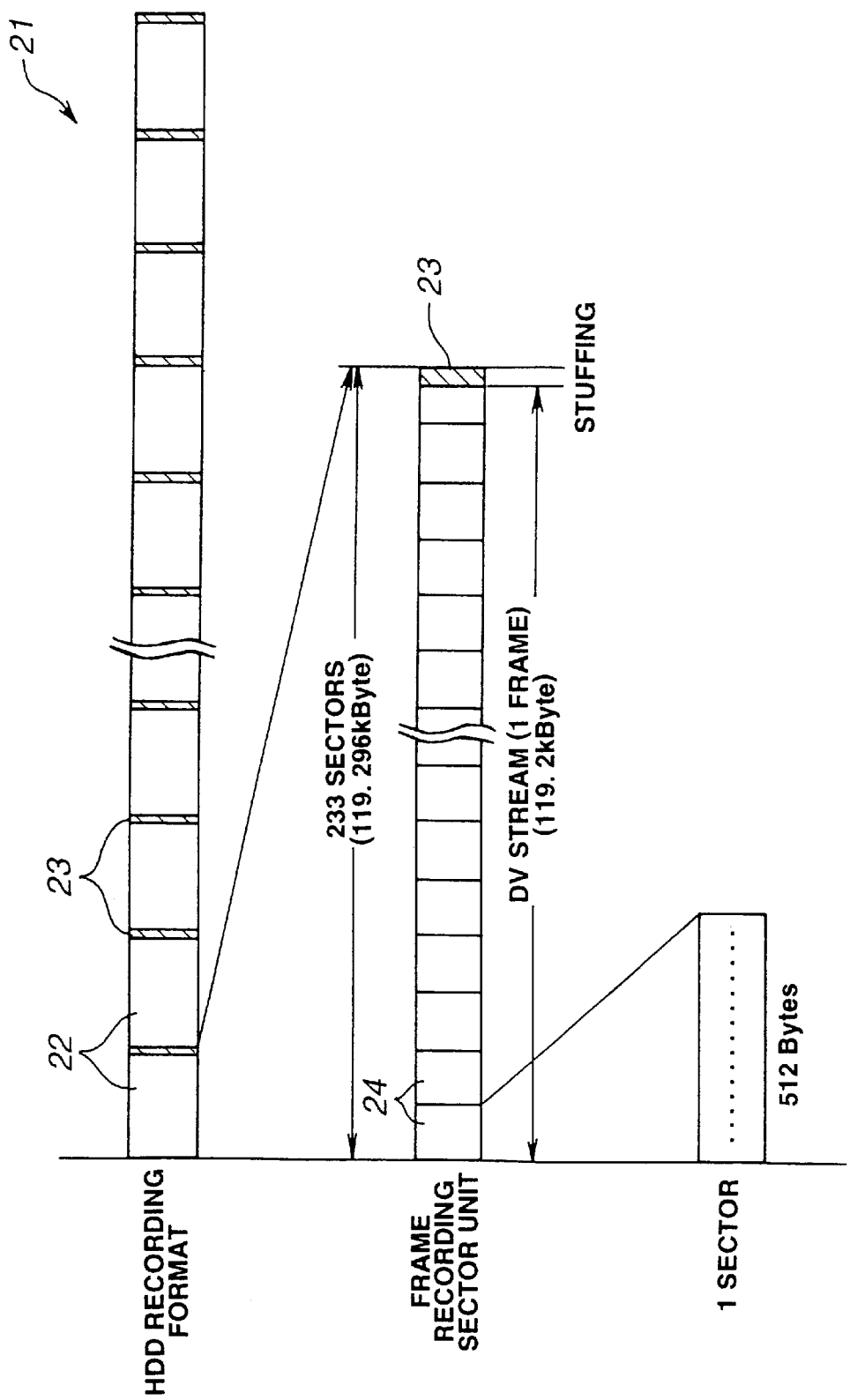
FIG. 7 shows the format of the HDD recording a datastream of the SD specifications.

The recording format of an HDD, as a recording medium, is constructed in terms of a 512-byte sector 24 as a unit, as shown in FIG. 7. If the DV system is of the SD specifications conforming to SD signals of the standard resolution, the AV digital data stream of 119.3 kByte is one frame. Thus, the AV digital data stream is continuously recorded as from the beginning portion of the contiguous 233 sectors corresponding to the 119.2 kByte and a marginal portion 23 of the last sector where the AV digital data stream has not been written is stuffed with optional data.

Figure 8:
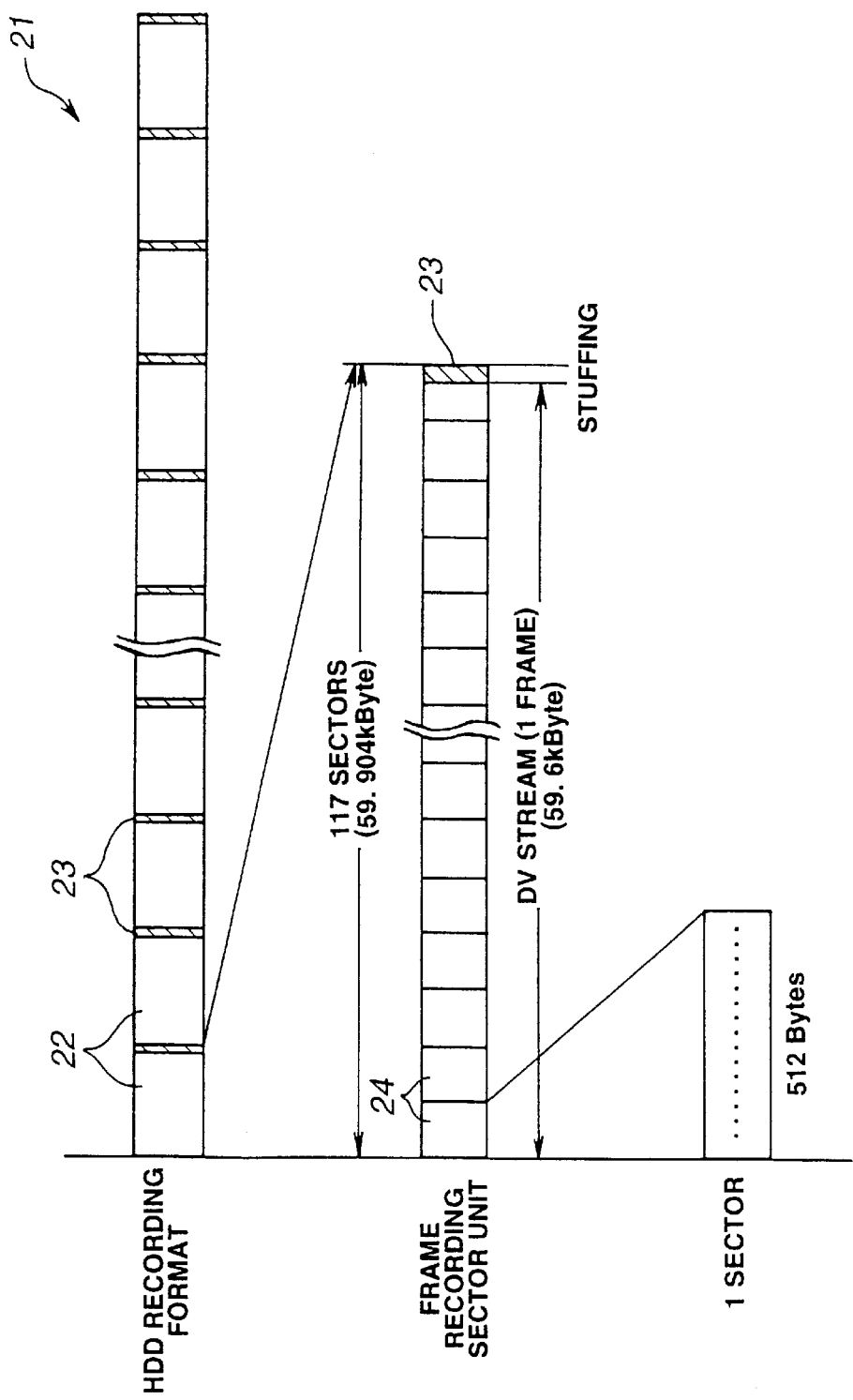
FIG. 8 shows the format of the HDD recording a datastream of the highly-compressed SD specifications.

If the DV system is of the high-compression SD specifications, as shown in FIG. 8, corresponding to the high-compression SD signals, one 59.6 kByte frame of DV signals of the high-compression SD specifications is continuously recorded as from the leading end of an 59.904 kByte area composed of 117 consecutive 512 byte sectors 24. The marginal portion 23 of the last sector where the AV digital data steam is not written is stuffed. That is, the AV digital data stream of high-compression SD specifications is recorded with 117 sectors as a unit. These 117 sectors are made up of a portion 22 where the AV digital data stream has been written and the stuffed marginal portion 23.

Figure 9:
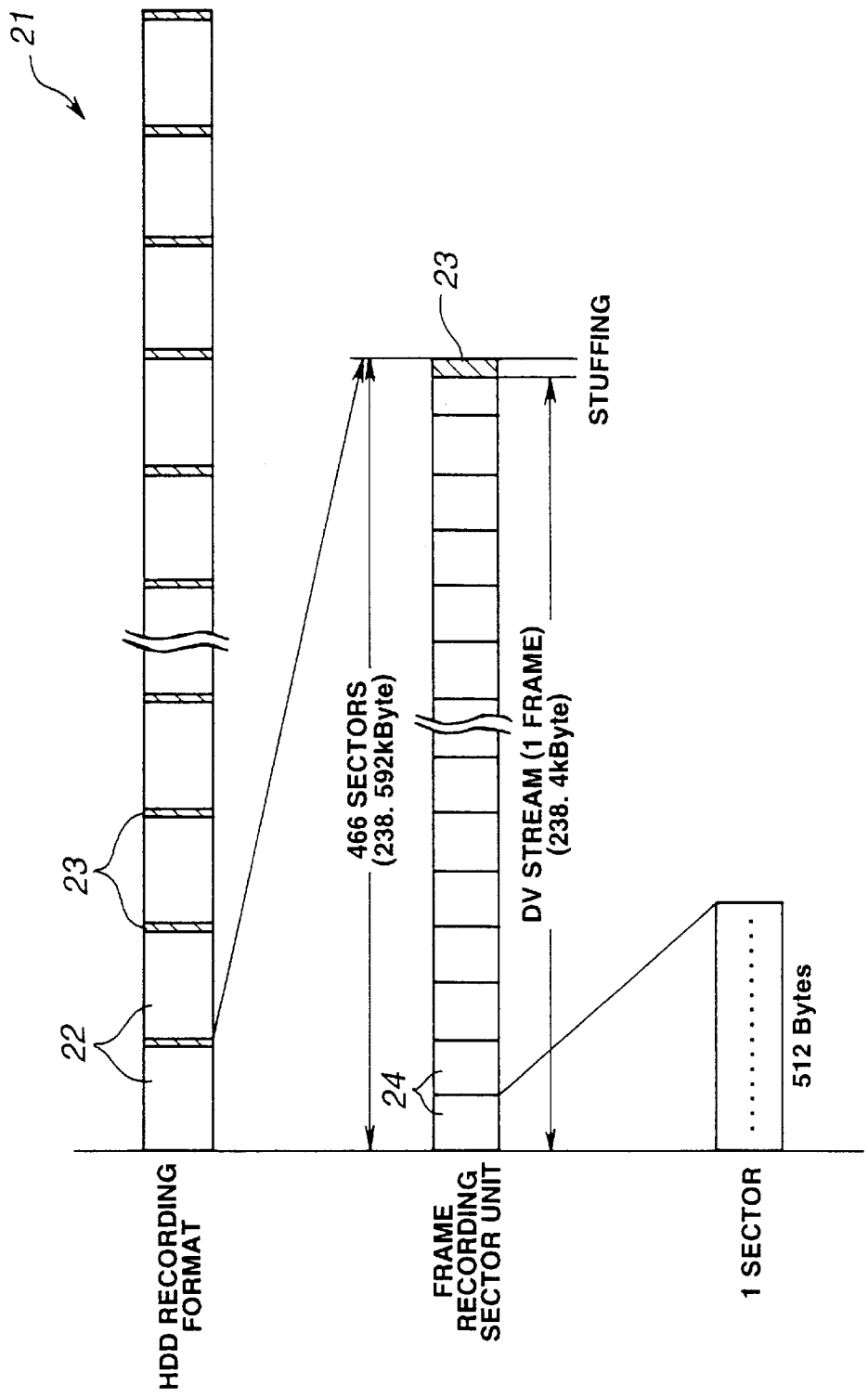
FIG. 9 shows the format of the HDD recording a datastream of the HD specifications.

If the DV system is of the HD specifications, as shown in FIG. 9, corresponding to the HD signals, one 238.4 kByte frame of DV signals of the UD specifications is continuously recorded as from the leading end of an 238.592 kByte area of composed of 446 consecutive 512 byte sectors 24. The marginal portion 23 of the last sector where the AV digital data steam is not written is stuffed. That is, the AV digital data stream of HD specifications is recorded with 466 sectors as a unit. These 117 sectors are made up of a portion 22 where the AV digital data stream has been written and the stuffed marginal portion 23.

If the DV system is of the HD specifications corresponding to the HD signals, one 238.4 kByte frame of DV signals of the HD specifications is continuously recorded as from the leading end of a 238.592 kByte area of composed of 466 consecutive 512 byte sectors 24. The marginal portion 23 of the last sector where the AV digital data stream is not written is stuffed. That is, the AV digital data stream of HD specifications is recorded with 466 sectors as a unit. These 466 sectors are made up of a portion 22 where the AV digital data stream has been written and the stuffed marginal portion 23.

Reference is had to a flowchart for illustrating a series of operations of the above-described information recording method.

Figure 10:
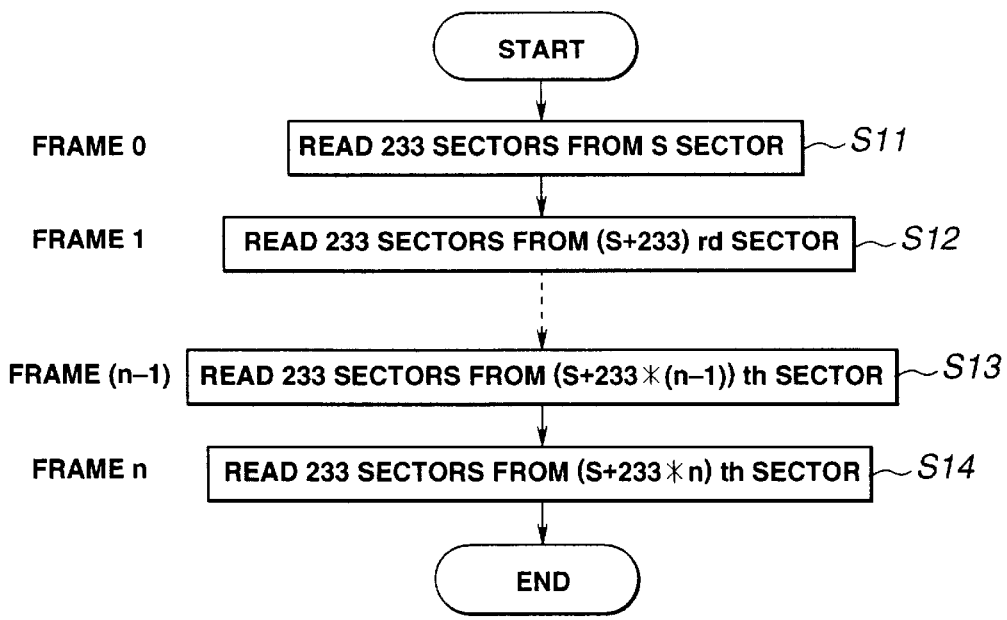
FIG. 10 is a flowchart showing a series of reproducing steps in the information recording method according to the present invention.

When reproducing the HDD having recorded thereon an AV digital data stream of the DV system of the SD specifications in accordance with the above-described recording format, the sequence of operations as shown in FIG. 10 is used.

At step S11, the 0'th frame of the AV digital data stream is read. In the case of the DV system of the SD specifications, each frame of the AV digital data stream is recorded with 233 sectors as a unit, so that, if the beginning point of recording of the AV digital data stream is the S'th sector, a 233-sector area corresponding to the AV digital data stream is read as from this S'th sector. Then, processing transfers to step S12.

At step S12, the first frame of the AV digital data stream is read. Here, a 233-sector area corresponding to one frame of the AV digital data stream is read as from the (S+233)rd sector corresponding to the sector next following the terminal point of recording of the 0'th frame of the AV digital data stream.

By the same sequence of operations, the DV signals of from the second frame to the (n–2)nd frame are read. Then, processing transfers to step S13 corresponding to the (n–1)st frame.

At step S13, the (n–1)th frame of the AV digital data stream is read. Here, the 233-sector area, corresponding to the one-frame AV digital data stream is read as from the (S+233*(n–1))th sector, corresponding to the sector next following the terminal point of recording of the (n–2)'nd frame of the AV digital data stream. Then processing transfers to step S14.

At step S14, the n'th AV digital data stream is read out. Here, the 233-sector area corresponding to one frame of the AV digital data stream as from the (S+233*n)th sector corresponding to the sector next following the terminal point of recording of the (n–1)'st frame of the AV digital data stream, is read out. Since this completes readout of the AV digital data stream from the 0'th frame to the n'th frame, the sequence of operations for reproducing the AV digital data stream is terminated.

Figure 11:
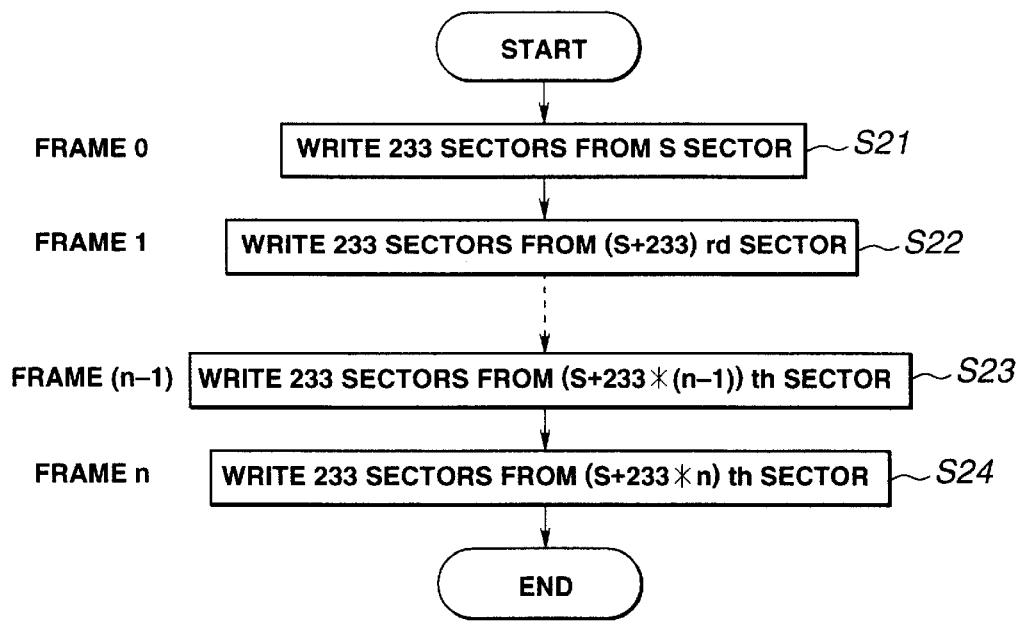
FIG. 11 is a flowchart showing a series of picture recording steps in the information recording method according to the present invention.

Referring to the flowchart of FIG. 11, the sequence of operations for recording the AV digital data stream on the HDD in accordance with the above-mentioned DV system of the SD specifications is explained.

At the first sep S21, the 0'th frame of the AV digital data stream is written. Here, a 233-sector area corresponding to one frame of the AV digital data stream of the SD specifications is written as from the leading end of the S'th sector which is the beginning point of start of the recording of the AV digital data stream. Then, processing transfers to step S22.

At step S22, the first frame of the AV digital data stream is written. Here, the first frame of the AV digital data stream is recorded in the 233 sectors corresponding to one frame of the SD signals as from the (S+233)rd sector corresponding to the sector next following the terminal point of recording of the 0'th frame of the AV digital data stream.

The AV digital data stream as from the second frame to the (n−2)nd frame of the AV digital data stream is recorded in a similar manner. Then, processing transfers to step S23.

At step s23, the (n−1)st frame of the AV digital data stream is written. Here, the (n−1)st frame of the AV digital data stream is recorded in the 233 sectors of the (n−1)st frame. The, processing transfers to step S24.

At step S24, the n'th frame of the AV digital data stream is written. Here, the n'th frame of the AV digital data stream is recorded in 233 sectors of the n'th frame. When the n'th frame of the AV digital data stream is written, the sequence of operations of recording the AV digital data stream comes to a close.

In the above explanation, the SD specifications are given as illustration of the DV system. It should be noted that the AV digital data stream of the high compression SD specifications can be coped with by changing the read/write unit to 117 sectors, while the AV digital data stream of the HD specifications can be coped with by changing the read/write unit in HDD to 466 sectors.

The above-described sequence of operations of the information recording method is explained in connection with the operation of the above-mentioned various component parts of the information recording device.

During reproduction, an AV digital data stream can be obtained in real-time by reading an AV digital data stream on the sector basis from the HDD 6, alternately writing the data via ATA adapter 5 and host bus 4 in the two-bank RAM 2a of the interface buffer 2 and by alternately reading the data on the frame pulse basis, under software control as in the process shown in FIG. 10. The reproduced moving picture is sent to the high efficiency encoder/decoder 1a of the DV video camera and displayed on the monitor 7. The same holds for the audio data which is sent via the encoder/decoder 1a so that reproduced audio data is obtained from speaker (SP) 7a.

If the logic block address LBA is set by software on the host side HOST, optional read/write can be realized on the sector basis in the HDD 6, so that, if the AV digital data stream is recorded by the above-described recording format, and is read from the specified sector for writing on or reading from the two-bank RAM 2a of the interface buffer 2, unneeded stuffing data can be eliminated. By variably controlling the readout sectors by software, and writing the read-out data via host bus 4 in the two-bank RAM 2a of the interface buffer 2, variable-speed reproduction can be realized solely by software control of the RISC CPU 3.

The mode setting commander 8 sends the IDs of the control code corresponding to the recording/reproducing/variable speed reproducing mode to the RISC CPU 3 via RS-232C. In the RISC CPU 3, associated application software items are started on the basis of these commander ID data to control the read/write of the HDD 6 by the driver software.

It is noted that mode command signals can be routed to the RISC CPU 3 from outside using an asynchronous mode of the IEEE1394 which is the digital interface employed in the present invention. Of course, the RISC CPU 3 may be a CISC having a set of commands other than the conventional reduced instruction set.

In the AV micro-computer system 10 of the present embodiment, shown in FIG. 1, a uni-format is used, in which the two-bank RAM 2a of the interface buffer 2, register of the HDD 6, RAM 17 and the ROM 9 in their entirety are mapped in the main memory of the RISC CPU 3. This allows the furnished data (AV digital data stream and IT data) to be freely read or written on or from the HDD 6 solely by the data transfer control software of the RISC CPU 3.

Figure 12:
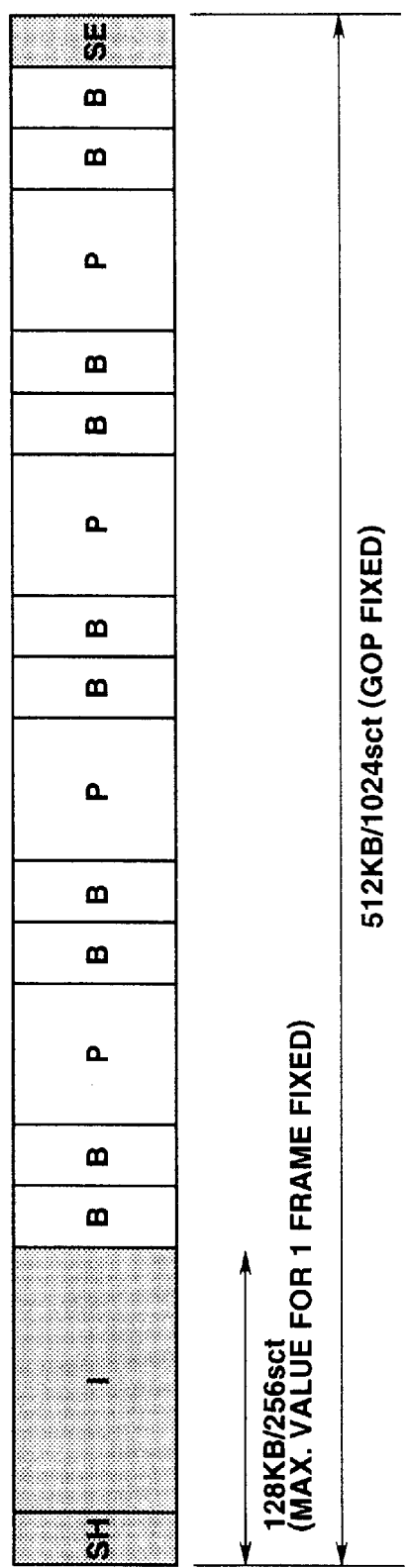
FIG. 12 shows GOP-based MPEG signals.

In the above-described embodiment, recording data are fixed in data length for recording on the frame basis in accordance with the DV standard. In addition, MPEG signals, that is picture or speech signals, compressed in accordance with the MPEG standard, can be fixed in length in terms of a group-of-pictures (GOPs) made up of 512 kB/1024 sct and recorded in this fixed length, subject to control of the compression rate, as shown in FIG. 12.

That is, although the above-described embodiment is directed to a system of realizing variable-speed reproduction with good accessibility by recording/reproducing DV signals in terms of multiples of the logical sectors of the hard disc, using a DV video camera, variable-speed reproduction may similarly realized with good accessing speed even with a device fed with MPEG signals if, when desired to construct a system similar to the above-described AV microcomputer system 10, using a device of receiving and outputting MPEG signals in place of the DV video camera, the GOP of the output MPEG signals and/or the maximum number of data of an I-frame is controlled to be fixed, and this number is adapted to be equal to a integer multiple of the number of the logical sectors of the hard disc.

Figure 13:
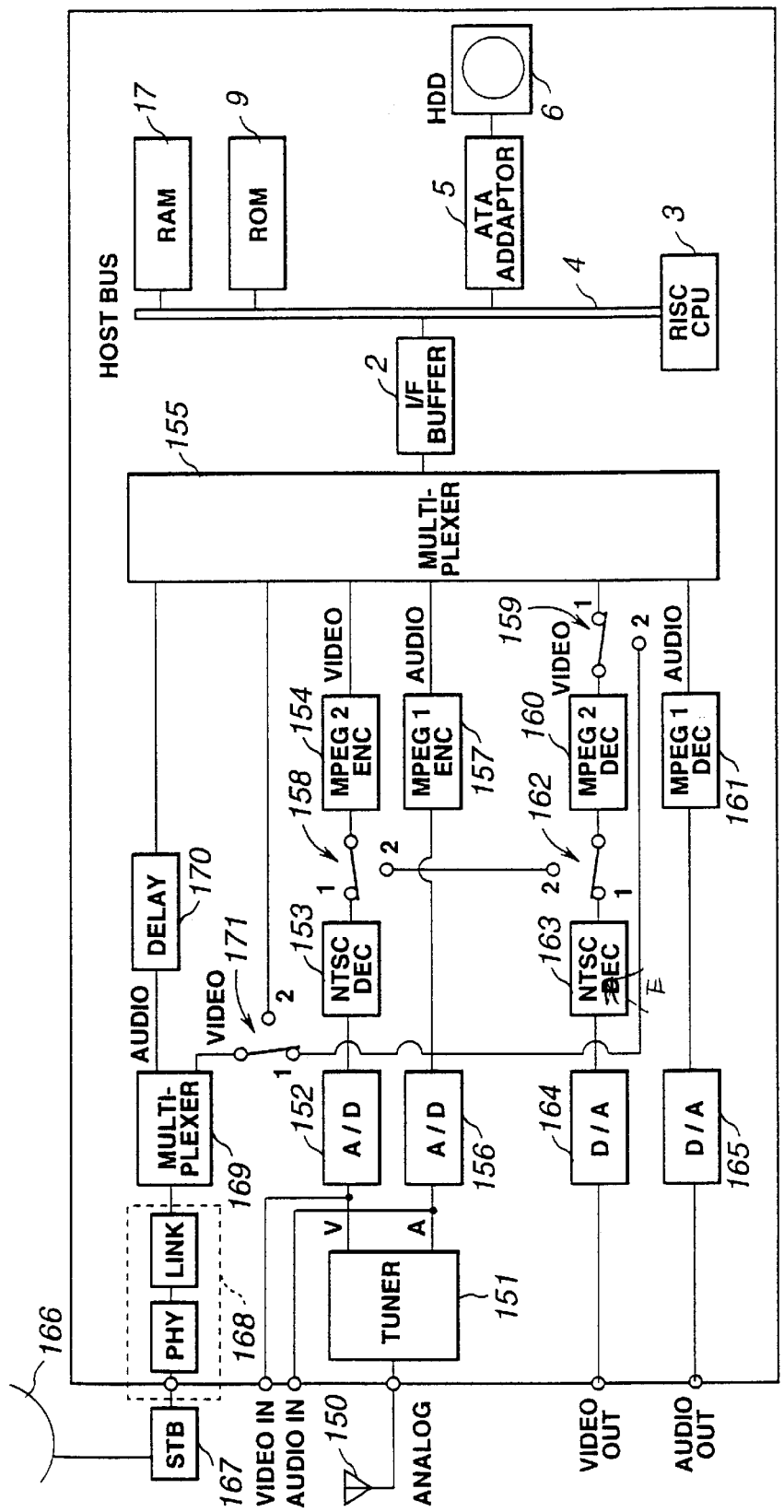
FIG. 13 is a block diagram showing another modification of an information recording device according to the present invention.

Referring to FIG. 13, the information recording device for recording/reproducing MPEG signals is made up of a tuner 151 fed with signals over an antenna 150 receiving video and audio signals of the analog system, an A/V converting circuit 152 for converting video signals entering the tuner 151 into digital data, a NTSC decoder 153 fed with video signals of the digital system from the A/V converting circuit 152, an MPEG2 encoder 154 fed with the video signals converted by the NTSC decoder 153 into baseband signals and a multiplexer 155 fed with the digital system MPEG data.

Also, this information recording device includes an A/V converting circuit 156, fed with audio signals sent to the tuner 151, and an MPEG1 encoder 157 fed with audio signals converted into the digital system signals by the A/V converting circuit 156.

The tuner 151 is fed with signals of, for example, the National Television System Committee (NTSC) system received over the antenna 150. This tuner 151b receives and detects the video and audio signals received over the antenna 150. The tuner 151 outputs the detected video signals to the A/V converting circuit 152 while outputting audio signals to the A/V converting circuit 156.

The A/V converting circuit 152 A/D converts video signals from the video input terminal or the tuner 1151 to produce video data. The A/V converting circuit 152 outputs video data of, for example, the NTSC system, to the NTSC decoder 153.

The NTSC decoder 153 is fed with video data of the NTSC system from the A/V converting circuit 152. This NTSC decoder 153 expands the input video data to generate baseband signals. The NTSC decoder 153 outputs baseband signals to the MPEG2 encoder 154 via a terminal 1 of a switch 158.

The MPEG2 encoder 154 compresses the baseband signals from the NTSC decoder 153. At this time, the MPEG2 encoder 154 converts the input baseband signals to digital data of the MPEG2 system. This MPEG2 encoder 154 encodes the input baseband signals at a predetermined compression rate so that the data volume corresponds to an interger multiple of the number of the logical sectors of the hard disc. That is, the MPEG2 encoder 154 effects compression encoding so that the input picture signals will be of a data volume corresponding to an interger number times the number of the logical sectors of the hard disc. The compression ratio may also be controlled so that the maximum data volume of encoded data compressed as the I-frame will be equal to an integer number multiple of the number of logical sectors of the hard disc.

The MPEG2 encoder 154 is also fed via a terminal 2 of the switch 158 and a terminal 2 of the switch 162 with baseband signals from an MPEG2 decoder 160. This MPEG2 decoder 160 encodes the baseband signals from the MPEG2 decoder 160 at a predetermined compression ratio.

Of the input signals at the antenna 150, the audio signals are outputted by the tuner 151 to the A/V converting circuit 156. The A/V converting circuit 156 A/D converts input audio signals to audio data to output the audio data to the MPEG1 encoder 157.

The MPEG1 encoder 157 multiplexes the video data from the MPEG2 encoder 154 with audio data from the MPEG1 encoder 157. If the video data and audio data are V and A, respectively, the multiplexer 155 compresses the data along time axis in terms of the GOP time of the MPEG signals as a unit to VAVAVA . . . to produce a digital data stream. The multiplexer 155 outputs the multiplexed digital data stream to the interface buffer 2.

The multiplexer 155 is fed from the interface buffer 2 with the digital data stream recorded on the hard disc in the HDD 6. This multiplexer 155 splits the digital data stream sent from the interface buffer 2 into video data and audio data. The multiplexer 155 outputs the video data obtained on splitting to a multiplexer 169 via a terminal 2 of the switch 171, while outputting the video data via the terminal 1 of the switch 159 to the MPEG2 decoder 160. The multiplexer 169 outputs the audio data obtained on splitting via a delay circuit 170 to the multiplexer 169, while outputting the audio data to an MPEG1 decoder 161.

The present information recording device also includes an antenna 166 for receiving MPEG system digital data, a set top box (STB) 167, a digital I/F circuit 168, a multiplexer 169 and a delay circuit 170.

The antenna 166 is fed with, for example, digital data of the MPEG system. This antenna 166 outputs received digital data as RF signals to the STB 167.

The STB receives digital data over antenna 166 by the front end to detect the received digital data. This STB 167 descrambles the scrambled digital data to output the descrambled digital data to a digital I/F circuit 168.

The STB 167 also is fed with digital data from the digital I/F circuit. The STB 167 has an enclosed MPEG decoder. The STB 167 decodes digital data from the digital I/F circuit 168, by the MPEG decoder, and expands the compressed video and audio data into picture signals and acoustic signals.

The digital I/F circuit 168 includes a physical layer/link layer processing circuit and processes digital data from the STB 167 with e.g., conversion to output the processed signals to the multiplexer 169. The digital I/F circuit 168 outputs the digital data to the STB 167.

The multiplexer 169 splits the digital data from the digital I/F circuit 168 into video data and audio data. This multiplexer 169 outputs the video data resulting from splitting via terminal 1 of the switch 171 and terminal 2 of the switch 159 to the MPEG2 decoder 160. The multiplexer 169 also outputs audio data to the delay circuit 170.

This multiplexer 169 is fed with video data from the multiplexer 155 via switch 171 and with audio data via delay circuit 170. The multiplexer 169 multiplexes input video and audio data to output the multiplexed data to the digital I/F circuit 168.

The delay circuit 170 adjusts audio data from the multiplexer 169 for delay. This delay circuit 170 delay-processes the audio data for adjusting the tine difference of the input audio data with respect to the input video data to output the delay-processed data to the multiplexer 155.

Of the video data and the audio data split by the multiplexer 155, only the audio data is sent to the delay circuit 170. This delay circuit 170 adjusts the audio data for delay with respect to the video data to output the audio data to the multiplexer 169.

The information recording device includes an MPEG2 decoder 160, fed with video data via terminal 2 of the switch 159, an MPEG1 decoder 161 fed with audio data obtained on splitting by the multiplexer 155, an NTSC encoder 163 fed via terminal 1 of the switch 161 with video data decoded by the MPEG2 decoder 160, a D/A conversion circuit 164, fed with data encoded by the NTSC encoder 163, and a D/A conversion circuit 165 fed with audio data decoded by the MPEG1 decoder 161.

The MPEG2 decoder 160 is fed via terminal 1 of the switch 159 with video data obtained on reading out digital data stream recorded on the HDD 6 by the data transfer software of the RISC CPU 3 and on splitting the read-out digital data stream by the multiplexer 155 via ATA adapter 5, host bus 4 and the interface buffer 2. This MPEG2 decoder 160 expands compressed input video data. The MPEG2 decoder 160 is fed with video data from the multiplexer 169 via terminal 2 of the switch 159. The MPEG2 decoder 160 outputs expanded input video data to the switch 162.

The switch 159 is controlled to be connected to the terminals 2 or 1 when the video data from the multiplexer 169 is entered to the MPEG2 decoder 160 or when the video data from the multiplexer 155 is entered to the MPEG2 decoder 160, respectively.

The switch 162 is controlled to be connected to the terminals 2 or 1 when the video data from the MPEG2 decoder 160 is outputted to the switch 158 or when the video data from the MPEG2 decoder 160 is outputted to the NTSC encoder 163, respectively.

The NTSC encoder 163 is fed via terminal 1 of the switch 162 with video data decoded by the MPEG2 decoder 160. This NTSC encoder 163 compresses the input video data in accordance with the NTSC system to output the compressed video data to a D/A conversion circuit 164.

The D/A conversion circuit 164 D/A converts the video data from the NTSC encoder 163 to video signals. The D/A conversion circuit 164 outputs the video signals to a video output terminal.

The MPEG1 decoder 161 is fed with audio data, obtained on splitting, from the multiplexer 155. This MPEG1 decoder 161 outputs the expanded audio data to the D/A conversion circuit 165.

The D/A conversion circuit 165 converts the audio data from the MPEG1 decoder 161 by D/A conversion to form audio signals which are outputted to its audio output terminal.

When recording digital data of the MPEG system received over the antenna 166 on the hard disc in the HDD 6, the information recording device first outputs the digital data via STB 167 and digital I/F circuit 168 to the multiplexer 169.

The multiplexer 169 splits the input digital data into video data and audio data. The multiplexer 169 outputs the audio data to the delay circuit 170.

The multiplexer 169 outputs the video data via switches 171 and 159 to the MPEG2 decoder 160. At this time, the switches 171, 159 are controlled to be connected to the terminals 1 and 2, respectively.

The MPEG2 decoder 160 then expands compressed video data to output the expanded video data via switches 162, 158 to the MPEG2 encoder 154. At this time, the switches 162, 158 are controlled to be connected to the terminals 2 and 2, respectively.

The MPEG2 encoder 154 then compresses the input video data. At this time, the MPEG2 encoder 154 compresses the GOP and/or the I-picture at a compression ratio corresponding to an interger times the number of the logical sectors of the hard disc in the HDD 6. Thus, the MPEG2 video stream, entered over antenna 166 and encoded at a predetermined compression ratio, has its compression ratio converted by the MPEG2 ENC154.

The audio data, delayed by the delay circuit 170, is outputted to the multiplexer 155 at a controlled timing, while video data from the MPEG2 encoder 154 is outputted to the multiplexer 155.

The multiplexer 155 multiplexes the input audio and video data to produce a digital data stream which is then recorded via interface buffer 2, host bus 4 and ATA adapter 5 on the hard disc in the HDD 6. Thus, with the present information recording device, MPEG data are recorded in terms of the logical sector of the hard disc as a unit.

If, in the present information recording device, analog signals of the NTSC system received over antenna 150 are recorded on the hard disc in the HDD 6, analog signals of the NTSC system are first outputted to the tuner 151.

The tuner 151 then detects analog signals from the antenna 150 to output video signals to the AIV converting circuit 152, while outputting audio signals to the A/V converting circuit 156. The A/V converting circuit 152 at this time can be fed with the video signals from its video input terminal, while the A/V converting circuit 156 can be fed with the with audio signals from its audio input terminal.

The A/V converting circuit 152 A/D converts the input video signals by A/D conversion to video data which is outputted to the NTSC decoder 153.

The NTSC decoder 153 expands the video data from the A/V converting circuit 152 to convert the video data to baseband signals which are outputted to the MPEG2 encoder 154. At this time, the switch 158 is controlled to be connected to the terminal 1.

The MPEG2 encoder 154 is fed via switch 158 with baseband signals. This MPEG2 encoder 154 encodes the input baseband signals at a predetermined compression ratio to MPEG data to form MPEG2 system video data. The MPEG2 encoder 154 encodes the input baseband signals at an integer number times the number of the logical sectors of the hard disc in the HDD 6 in order to compress the GOP and/or the I-frame. This MPEG2 encoder 154 outputs the video data to the multiplexer 155.

The A/V converting circuit 156, fed from the tuner 151 with the audio signals, A/D converts the audio signals to form audio data which is outputted to the MPEG1 encoder 157.

The MPEG1 encoder 157 encodes the audio data from the A/V converting circuit 156 in accordance with the MPEG1 system to output the encoded audio data to the multiplexer 155.

The multiplexer 155 multiplexes video data entered from the MPEG2 encoder 154 and audio data entered from the MPEG1 encoder 157 to generate a digital data stream.

The multiplexer 155 records the generated digital data stream via interface buffer 2, host bus 4 and ATA adapter 5 on the hard disc in the HDD 6. Thus, in the present information recording device, the MPEG system digital data stream is recorded in terms of the number of logical sectors of the hard disc as a unit.

If, in the present information recording device, the digital data stream recorded on the hard disc in the HDD 6 is reproduced, the digital data stream stored in the HDD 6 in terms of the logical sectors of the hard disc as a unit are read out by the data transfer software started by the RISC CPU 3. At this time, the RISC CPU 3 can read out the digital data stream stored in the HDD 6 under software control by, for example, a variety of variable speed reproducing modes.

Then, in the present information recording device, the digital data stream read out from the HDD 6 is entered via ATA adapter 5, host bus 4 and interface buffer 2 to the multiplexer 155. The multiplexer 155 splits the input digital data stream to produce video and audio data.

If, in the present information recording device, the digital data stream recorded on the hard disc is to be reproduced as digital data, the video data is outputted from the multiplexer 155 via switch 171 to the multiplexer 169, while audio data is adjusted for delay by the delay circuit 170 and outputted to the multiplexer 169.

The multiplexer 169 multiplexes the input audio data with the video data to output the multiplexed data to the digital I/F circuit 168. The audio data and the video data are fed to the STB 167 and converted into speech and video signals by an MPEG decoder in the STB 167 so as to be variable-speed-reproduced, seamless-reproduced or non-linear edit-reproduced under software control by the RISC CPU 3.

On the other hand, if, in the present information recording device, a digital data stream recorded on the hard disc is reproduced as analog signals, the video data is outputted from the multiplexer 155 via terminal 1 of the switch 159 to the MPEG2 decoder 160.

The MPEG2 decoder 160 then decodes the video data from the multiplexer 155 to output the decoded video data via terminal 1 of the switch 162 to the NTSC encoder 163.

The NTSC encoder 163 then converts digital data from the MPEG2 decoder 160 into NTSC system video data. The NTSC encoder 163 outputs the video data of the NTSC system to the D/A conversion circuit 164.

The D/A conversion circuit 164 then D/A converts the video data from the NTSC encoder 163 to output the converted data as video signals of the NTSC system to a video output terminal.

The multiplexer 155 also outputs audio data to the MPEG1 decoder 161. This MPEG1 decoder 161 decodes the audio data from the multiplexer 155 to output the decoded data to the D/A conversion circuit 165.

The D/A conversion circuit 165 D/A converts audio signals from the MPEG1 decoder 161 to output the converted audio signals at an audio terminal.

Thus, when recording digital data compressed by the MPEG system, the information recording device decodes the data by the MPEG2 decoder 160 and the MPEG2 encoder 154 encodes and records the data at a predetermined compression ratio at an integer number times the number of the logical sectors of the hard disc in the HDD 6. If fed with the NTSC system signals, the MPEG2 encoder 154 also encodes the signals by the encoder 154. Therefore, the recorded digital data can be reproduced by simply specifying the address information of the hard disc using, for example, the data transfer software, thus enabling facilitated accessing of the hard disc. Thus, with the present information recording device, reproduction with a variable read-out speed is facilitated to enable adoption of a variety of reproducing systems.

In the above-described information recording device, the MPEG2 encoder 154 compresses data by the MPEG2 encoder 154 by a factor equal to an integer number times the number of logical sectors of the hard disc. It is however possible for the MPEG2 encoder 154 to effect compression using plural fixed rates. Specifically, with the MPEG2 encoder 154, if the digital data stream compressed and recorded on the hard disc is used for editing, for standard play (SP) and for long play (LP), the compression factor of 8 Mbps, 4 Mbps and 2 Mbps, respectively, may be used. For reproducing the digital data stream recorded on the hard disc by the information recording device, the data volume to be read can be controlled under control by the data transfer software in the RISC CPU 3 in order to effect reproduction in the same manner as described above.

Reference is had to a flowchart for illustrating a variety of reproducing methods described above.

Figure 14:
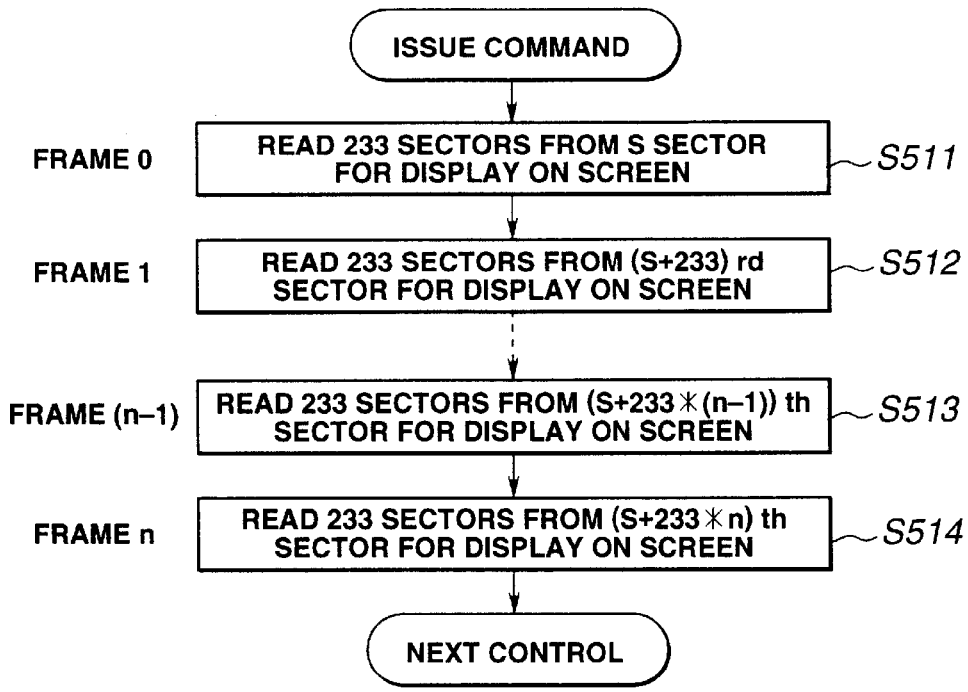
FIG. 14 shows a series of steps of variable-speed reproducing processing in the information reproducing method.

For normal reproduction, a sequence of operations shown in FIG. 14 is used.

At a first step S511, an AV digital data stream of a 0'th frame is read. In the DV system of the SD specifications, a one-frame AV digital data stream is recorded in terms of 233 sectors as a unit. Thus, if the recording start point of this AV digital data stream is an S'th sector, an area of 233 sectors, corresponding to one-frame AV digital data stream as from this S'th sector, is read. Processing then transfers to step S12.

At step S512, the first frame of the AV digital data stream is read. At this step, a 233-sector area corresponding to one frame of the AV digital data stream as from the (S+233)rd sector next following the recording end point of the 0'th framer of the AV digital data stream is read.

By the similar sequence of operations, DV signals from the second frame up to the (n−2)nd frame are read. Then, processing transfers to step S513 for the (n−1)st frame.

At step S513, the (n−1)st frame of the AV digital data stream is read. At this step, a 233-sector area corresponding to the one-frame AV digital data stream as from the (S+233*(n−1))st sector next following the recording end point of the (n−2)nd frame of the AV digital data stream is read, before processing transfers to step S514.

At step S514, the n'th frame of the AV digital data stream is read. At this step, a 233-sector area corresponding to the one-frame AV digital data stream as from the (S+233*n)th sector next following the recording end point of the (n−1)st frame of the AV digital data stream is read. Since this completes the reading of the AV digital data stream as from the 0'th frame up to the n'th frame, the sequence of operations of reproducing the AV digital data stream is terminated.

Thus, the usual reproducing function is achieved by sequentially reading 233 sectors of one sector as from the current sector of the HDD representing the point of interruption of the recording data unit and by sequentially displaying the read-out data on the screen.

Figure 15:
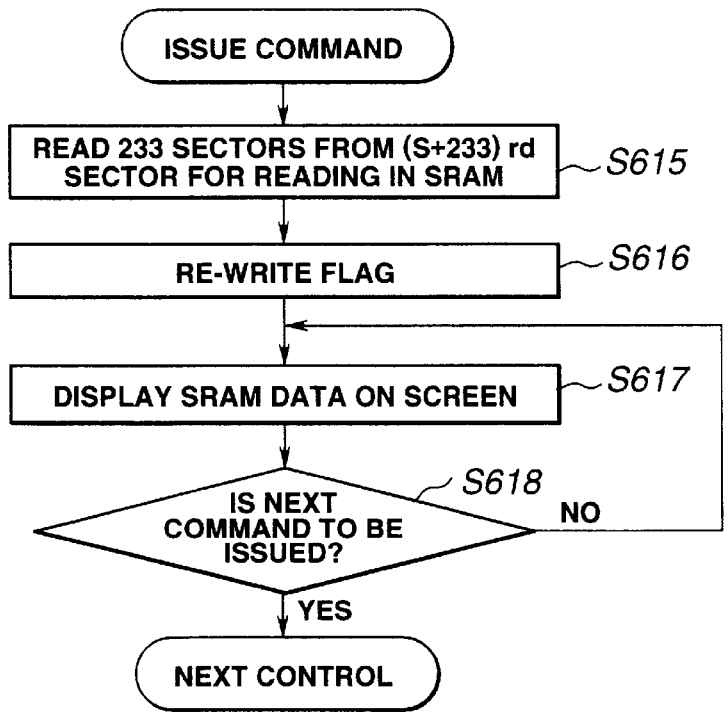
FIG. 15 shows a series of skipping steps in the information reproducing method.
Figure 16:
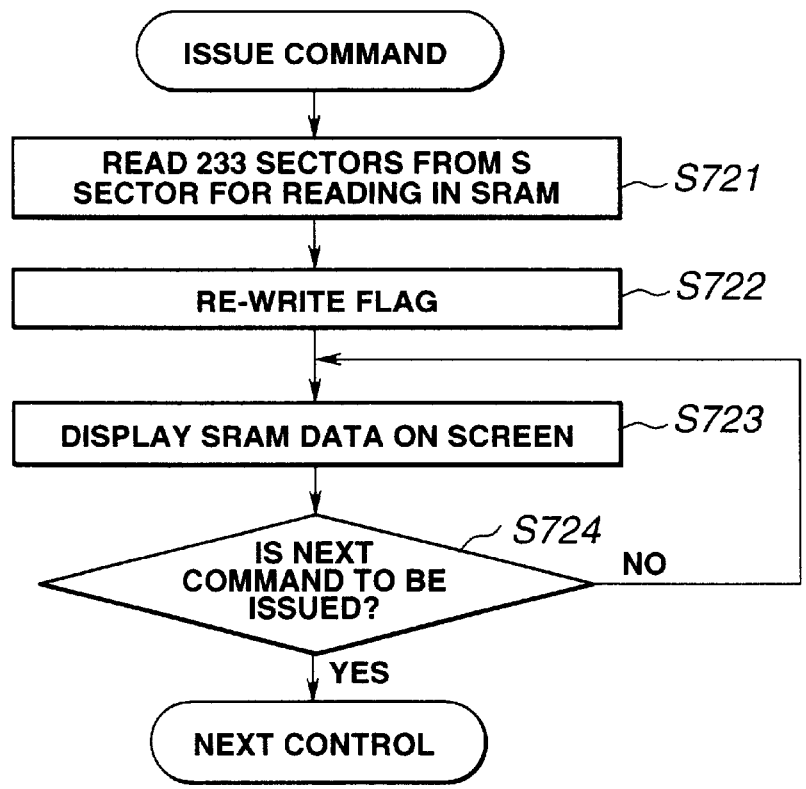
FIG. 16 shows a series of still steps in the information reproducing method.

Next, the sequence of operations for skipping is explained. This skipping is performed by the sequence of operations shown in FIG. 15.

At a first step S615, data of the (S+233)rd sector corresponding to the AV digital data stream ahead of the S'th sector as the beginning point of the DV data by one frame of the SD specifications is read into an SRAM as a volatile memory. Then processing transfers to step S16.

At step S616, the flag of the AV digital data stream written in the SRAM at step S15 re-written, before processing transfers to step S617.

At this step S617, the AV digital data stream, read in the SRAM at step S615 and having its flag re-written at step S616, is displayed on the screen. Then, processing transfers to step S618. The re-written flag of the AV digital data stream will be explained subsequently.

At step S618, branching occurs depending on whether or not the next command has been issued. If the next command is issued (YES), the sequence of operations of this step is terminated to proceed to the next control. If the next command is issued (NO), processing reverts to the previous step S617.

Thus, the function of skipping is achieved by reading data one frame or 233 sectors ahead of the current sector of the HDD as a point of interruption of the recording data units, each time a skip button is thrust, saving the read-out data in the SRAM and by continuously displaying the frame data saved in the SRAM on the screen.

Next, a sequence of operations for performing a still operation, shown in FIG. 6, is explained.

At a first step S721, 233-sector data corresponding to one-frame of the AV digital data stream of the SD specifications is read into the SRAM as from the S'th sector as a start point of DV data. Then, processing transfers to step S722.

At step S722, the flag of the AV digital data stream, read into the SRAM at step S721, is rewritten, before processing transfers to step S723.

At step S723, the AV digital data stream, read into the SRAM at step S721 and whose flag has been rewritten at step S722, is displayed on the screen. Then, processing transfers to step S724.

At step S724, the flow branches depending on whether or not the next command has been issued. That is, if the next command has been issued (YES), the sequence of operations of this step is terminated so that control proceeds to the next process. If the next command has not been issued (NO), processing reverts to the previous step S723.

In this manner, the still function is realized by reading 233 sectors as from the current sector of the HDD representing the junction of the recording data unit, storing the read-out sectors in the SRAM and by continuously displaying frame data stored in the SRAM on the screen.

Figure 17:
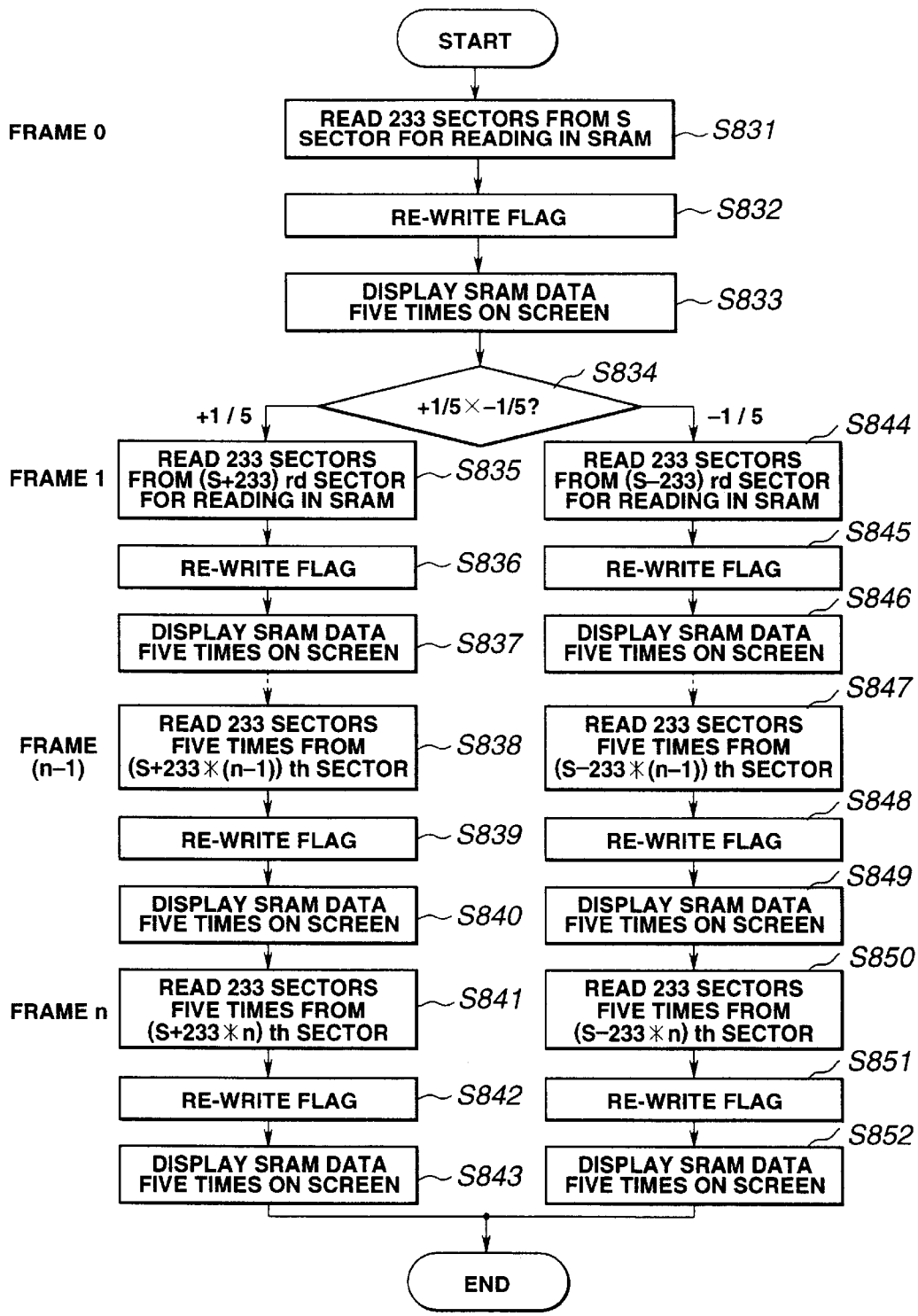
FIG. 17 shows a series of slow steps in the information reproducing method.

The sequence of operations of the slow operation is explained. It is assumed that the playback speed is lowered to a 1/5-speed. For this slow operation, the sequence of operations shown in FIG. 17 is used.

At a first step S831, 233-sector data corresponding to one-frame AV digital data stream of the SD specifications, corresponding to the beginning point of the DV data, is read into the SRAM, before processing transfers to step S832.

At step S832, the flag of the AV digital data stream read at step S831 into the SRAM is rewritten before processing transfers to step S833.

At step S833, the data read into the SRAM at step S831 and whose flag has been rewritten at step S832 is displayed five times on the screen, before processing transfers to step S834.

At step S834, the flow branches depending on whether the slow playback is to proceed in the forward direction (+1/5) or in the reverse direction (−1/5). If the slow reproduction is in the forward direction, processing transfers to step S835 and, if otherwise, processing transfers to step S844.

At step S835, 233-sector data corresponding to one frame of the SD specifications is read in the SRAM as from the (S+233)rd sector next following the sector to which belongs the end point of the 0'th frame of the AV digital data stream. Then, processing transfers to step S836.

At step S836, the flag of the AV digital data stream read at step S835 into the SRAM is rewritten before processing transfers to step S837. At this step S837, the data read into the SRAM at step S835 and whose flag has been rewritten at step S836, is displayed five times on the screen.

In a similar manner, the sequence of operations as from the second frame to the (n−2)nd frame is performed sequentially, before processing transfers to step S838.

At this step S838, 233-sector data corresponding to one frame of the SD specifications is read in the SRAM as from the (S+233*(n−1))st sector next following the sector to which belongs the end point of the AV digital data stream of the (n−2)nd step. Then, processing transfers to step S839.

At step S839, the flag of the AV digital data stream read at step S838 into the SRAM is rewritten before processing transfers to step S840.

At this step S840, the data read into the SRAM at step S838 and whose flag has been rewritten at step S839, is displayed five times on the screen, before processing transfers to step S841.

At this step S841, 233-sector data of the AV digital data stream corresponding to one frame of the SD specifications is read in the SRAM as from the (S+233*n)th sector next following the sector to which belongs the end point of the AV digital data stream of the (n−1)st step. Then, processing transfers to step S842.

At step S842, the flag of the AV digital data stream read at step S841 into the SRAM is rewritten before processing transfers to step S843.

At this step S843, the data read into the SRAM at step S840 and whose flag has been rewritten at step S842, is displayed five times on the screen. Since display of the AV digital data stream up to the n'th frame has now come to a close, the sequence of the operating steps is terminated.

At step S844, 233-sector data of the AV digital data stream corresponding to one frame of the SD specifications is read into the SRAM as from the (S−233)rd sector which is a beginning sector of a previous frame to the 0'th frame of the AV digital data stream. Then, processing transfers to step S845.

At step S845, the flag of the AV digital data stream, read into the SRAM at step S844, is re-written, before processing transfers to step S846. At this step S846, data read into the SRAM at step S844 and whose flag has been rewritten at step S845, is displayed five times on the screen.

In a similar manner, the sequence of operations as from the second frame up to the (n−2)nd frame is performed before processing transfers to step S847 for the (n−1)st frame.

At step S847, a 233 sector AV digital data stream corresponding to one frame of the SD specifications is read into the SRAM from the (S−233×(n−1))st sector which is a beginning sector of a frame preceding the (n−2)nd frame of the AV digital data stream. Then, processing transfers to step S848.

At step S848, the flag of the AV digital data stream read into the RAM at step S847 is rewritten before processing transfers to step S849.

At step S849, the data read at step S847 into the SRAM and whose flag has been rewritten at step S848 is displayed five times on the screen, before processing transfers to step S850.

At step S850, a 233-sector AV digital data stream corresponding to one frame of the SD specifications is read into the SRAM from the (S−233*n)th sector which is a beginning sector of a frame preceding the (n−1)st frame of the AV digital data stream. Then, processing transfers to step S851.

At step S851, the flag of the AV digital data stream read into the RAM at step S850 is rewritten before processing transfers to step S852.

At step S852, the data read at step S850 into the SRAM and whose flag has been rewritten at step S851 is displayed five times on the screen. Since this completes display of the AV digital data stream up to the n'th frame, the sequence of operations is terminated.

In this manner, the slow function reads 233 sectors from the current sector of the frame interruption to store the read sectors in the SRAM to rewrite the flag of data saved in the SRAM to display the frame data five times on the screen. The slow reproducing speed is realized by designating an optional number of times of display on the screen.

Figure 18:
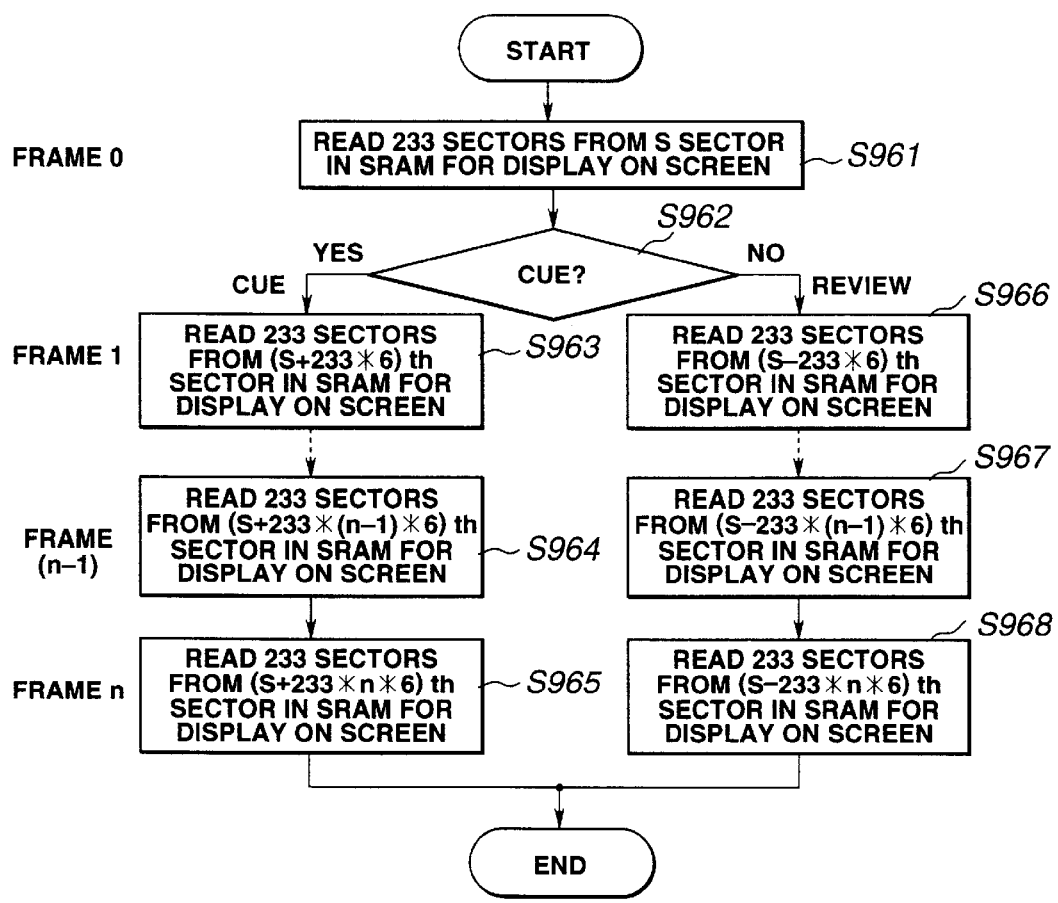
FIG. 18 shows a series of review/slow steps in the information reproducing method.

Next, the sequence of the cue-review operation is explained. This cue-review operation is achieved by the sequence of operations shown in FIG. 18.

In this sequence of cue-review operations, similarly to the slow playback operation, a set of operations, namely reading the AV digital data stream, reading the AV digital data stream into an SRAM and displaying the AV digital data stream read into the RAM on a screen, is performed. For simplicity, these operations are indicated by a sole block.

At a first step S961, a one-frame AV digital data stream of the SD specifications is read into the SRAM as from the S'th sector as a beginning point of the AV digital data stream and the AV digital data stream thus read into the SRAM is displayed on the screen. Then, processing transfers to step S962.

At this step S962, the flow branches depending on whether the operation is cue or review. In the former case (YES), processing transfers to step S963 and, in the latter case (NO), processing transfers to step S966.

At step S963, display is made for the first frame. Here, 233 sectors of the AV digital data stream are read as from the (S+233*6)th sector corresponding to a frame six frames ahead of the 0'th frame, and the AV digital data stream thus read is displayed on the screen.

In a similar manner, the second to (n−2)nd frames are displayed sequentially before processing transfers to step S964.

At step S964, display is made for the (n−1)st frame. Here, 233 sectors of the AV digital data stream are read as from the (S+233*(n−1))th sector corresponding to a frame six frames ahead of the (n−2)nd frame, and the AV digital data stream thus read is displayed on the screen, before processing transfers to step S965.

At step S965, display is made for the n'th frame. Here, 233 sectors of the AV digital data stream are read as from the (S+233*n*6)th sector corresponding to a frame six frames ahead of the (n−1)st frame, and the AV digital data stream thus read is displayed on the screen.

When the display of pictures up to the n'th frame has come to a close, the sequence of operations is terminated.

At step S966, display is made for the first frame. Here, 233 sectors of the AV digital data stream are read as from the (S−233*6)th sector corresponding to a frame six frames ahead of the 0'th frame, and the AV digital data stream thus read is displayed on the screen.

In a similar manner, the second to (n−2)nd frames are displayed sequentially, before processing transfers to step S967.

At step S967, display is made for the (n−1)st frame. Here, 233 sectors of the AV digital data stream are read as from the (S−233*(n−1)*6)th sector corresponding to a frame six frames ahead of the (n−2)nd frame, and the AV digital data stream thus read is displayed on the screen, before processing transfers to step S968.

At step S968, display is made for the n'th frame. Here, 233 sectors of the AV digital data stream are read as from the (S−233*n*6)th sector corresponding to a frame six frames ahead of the (n−1)st frame, and the AV digital data stream thus read is displayed on the screen.

When the display is made up to the n'th frame, the sequence of operations is terminated. Specifically, the cue/review function skips the number of sectors corresponding to six times 233 sectors as from an optional sector representing a frame interruption to display the read-out AV digital data stream on the screen. The cue/review playback speed is realized by adjusting the optional integer number of the sectors to be skipped.

In the above explanation, the SD specifications have been shown as illustrative of the DV system. It is noted that the AV digital data stream of the high-compression SD specifications and that of the HD specifications can be coped with by changing the read/write unit to 117 and to 466, respectively.

The slow search and fast search functions are executed in a similar manner. The slow search function reads 233 sectors as from the current sector representing a frame interruption and stores the read-out sectors in an SRAM. The slow search then displays the frame data stored in the SRAM an optional number of times on the screen to then sequentially display the data frame by frame on the screen an optional number of times. The playback speed can be continuously changed by continuously changing the value of the optional number of times of repeated display on the screen by a control screen of a commander connected to the RS-233C.

The fast search function skips the number of sectors equal to an optional integer number of times of 233 sectors as from an optional sector corresponding to a frame interruption and reads frame data to display the data on the screen. The playback speed can be continuously changed by continuously changing the number of the skipped sectors by the control screen of the commander connected to the RS-232C.

The control screen of the mode setting commander 8 for controlling the above function is now explained. This mode setting commander 8 is connected to the RISC CPU board 20 via RS-232C and is adapted to be controlled by a control bar so that continuous changes in the variable speed playback speed can be sensually controlled on its control screen.

Figure 19:
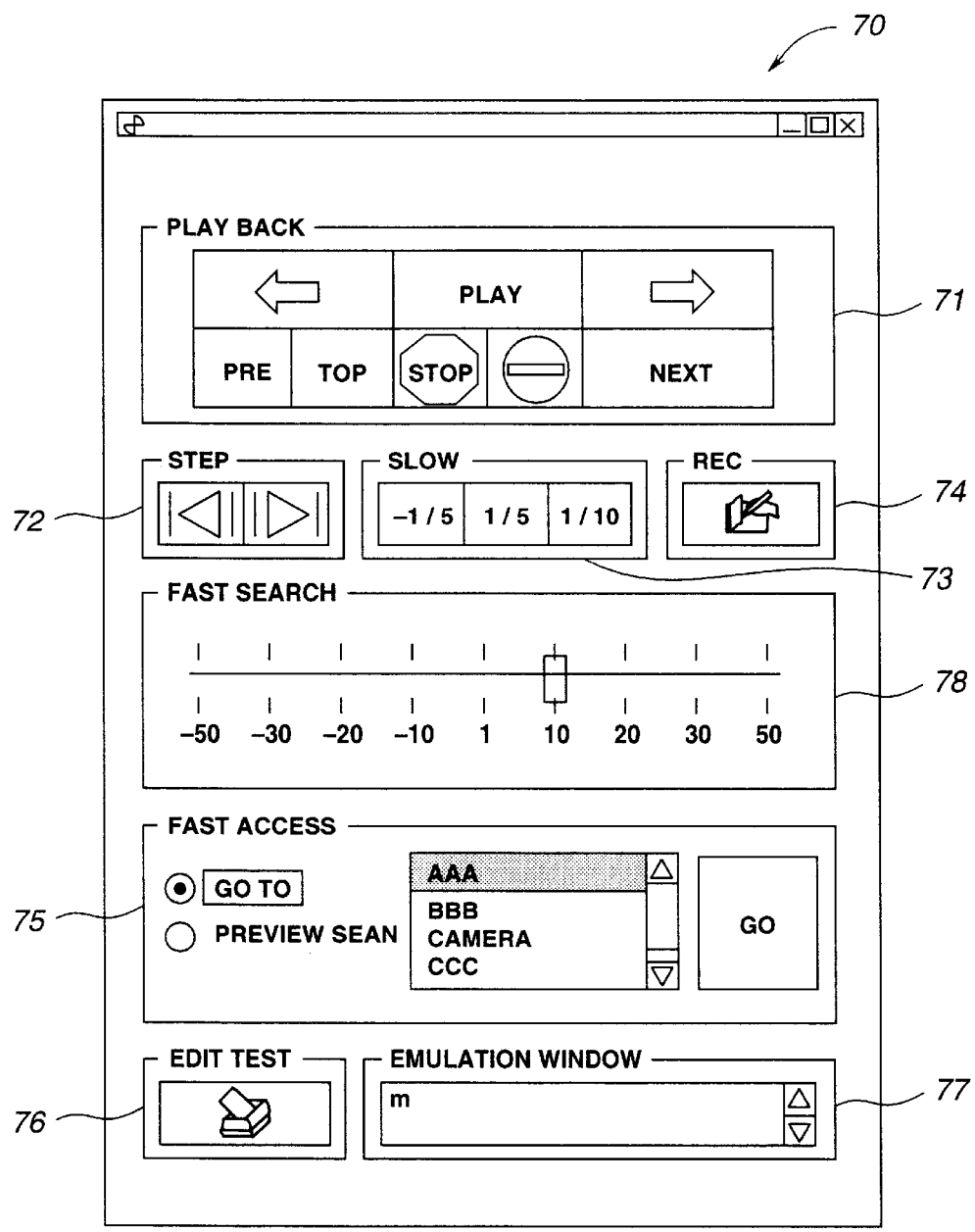
FIG. 19 shows an example of an actuating unit displayed on a display picture of the reproducing device.

This control screen is comprised of plural buttons and windows arranged in a vertically elongated substantially rectangular window, as shown in FIG. 19. That is, looking from the upper to the lower sides of FIG. 19, there are arranged a tier of "Play Back" 71, a tier of "Step" 72, "Slow" 73 and "Rec" 74, a tier of "Fast Search" 78, a tier of "Fast Access" 75 and a tier of "Edit Test" 76 and "Emulation Window" 77.

The "Play Back" 71 has buttons such as "←", "Play", "→", "Pre", "Top", "Stop" or "Next" to enable selection of a variety of playback functions. These buttons can be selected by positioning a screen-simulating cursor by a mouse on a button and clicking the mouse.

The "Step" 72 has a left-direction button "<" and a right direction button ">" to enable step selection in the reverse and forward directions, respectively. The "Slow" 73 has buttons "−1/5", "1/5" and "1/10" to enable 'slow' selection of 1/5 in the reverse direction and 1/5 and 1/10 in the forward direction. The selection of "Rec" 74 enables recording of a defined item.

The tier "Fast Search" 75 has a controller for moving a speed-associated button in the horizontal direction. By moving this button in association with a defined speed, the playback speed can be continuously changed from −50 to 50, that is from a 50-tuple playback speed in the reverse direction to the 50-tuple playback speed in the forward direction.

The tier "Fast Access" 75 has so-called toggle buttons "Go to" and "Preview Scan" for on/off switching, a window capable of scrolling-selecting contents such as "AAA", "BBB", "Camera" or "CCC" and a "Go" button for executing the function selected by the toggle button as for the contents.

The tier "Edit Test" 76 has a button of testing the editing function and the tier "Emulation Window" 77 has a window for displaying the real contents of a command sent to the RISC CPU.

Although the above description has been made with reference to the SD specifications of the DV system, it should be noted that the present invention is similarly applicable to the high-compression DS and HD specifications.

Figure 20:
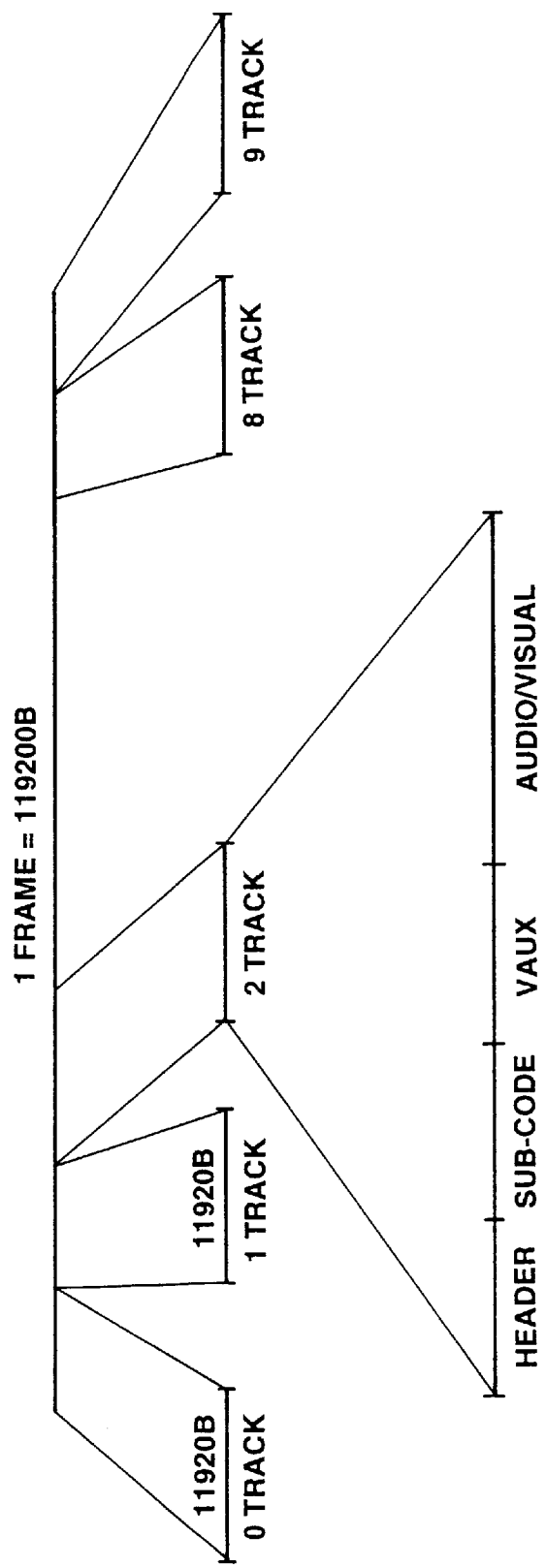
FIG. 20 shows an illustrative data structure used in the reproducing device.

The data structure of the SD specifications is explained here for reference sake. The data volume corresponding to a frame of the data stream of the SD specifications is 119200 byte, as shown in FIG. 20. Each frame is made up of ten tracks of from the 0'th to the ninth track, each being of 11920 byte. Each track is made up of data "header", "subcode", "VAUX" and "audio/visual".

Turning to the flags of the above data structure, an on/off control flag of the muting function of stopping the speech output is associated with "Speed" in the data structure of AAUX contained in 10 tracks making up a data stream for one frame. If this "Speed" has a usual value of "0100000", the speech is outputted, whereas, if otherwise, the muting state of stopping the speech output is set. If the reproducing device is in a state other than the usual playback state, this muting state is prevalent.

The flags for switching control between the field still and the frame still are associated with "FF" and "FC" in the data structure of VAUX provided n each track. Here, "FF" and "FC" denote frame field flag and first second flag, respectively.

If "FF" is 1, two field making up a frame are outputted, whereas, if it is 0, one of the two fields is outputted twice on end. If "FF" is 1 or 0, the first field "FS" or the second field is outputted in succession.

If the playback state is still playback, the so-called frame still, in which first and second fields of a frame ate outputted on end, is switched to a so-called field still, in which one of the first and second fields is outputted. This prohibits blurring of pictures even if abrupt movements such as those occurring on golf club swinging are displayed on a screen.

On the other hand, a seamless repeat function exploiting high-speed accessing characteristics of an HDD can be easily realized by designating a sector corresponding to AV data desired to be repeated.

Although the foregoing description has been made on realization of variable-speed reproduction with good accessibility by recording/reproducing DV signals at a rate equal to a integer number times the number of sectors on the hard disc, similar variable-speed reproduction with good accessibility can be realized in MPEG by fixing the number of data of the GOP and one-frame data of the MPEG signals and by fitting the fixed number of data to an inter number times the number of sectors.

What is claimed is:

1. An information recording apparatus for recording information on a disk type recording medium so as to facilitate variable speed reproduction of said information from said disk type recording medium, comprising:

an encoder operable to encode an input video signal representative of a plurality of video frames;

a controller operable to control said encoder to encode groups of said video frames into respective fixed size data blocks, each one of said groups of video frames including a predetermined number of video frames; and a recording unit operable to record each of said fixed size data blocks into a predetermined integer number of contiguous sectors of said recording medium, said predetermined number of sectors being set according to a level of compression of said video signal, whereby the respective first frames of said data blocks occur at a period equal to said predetermined number of sectors; and whereby said predetermined number of sectors is determined in accordance with a selected recording mode, and for said selected recording mode the number of said predetermined sectors allocated to each said video frame is constant.

2. An information recording apparatus as set forth in claim 1, wherein said predetermined number of video frames is one frame.

3. An information recording apparatus as set forth in claim 1, wherein said predetermined number of video frames is more than two frames.

4. An information recording apparatus as set forth in claim 3, wherein the first frame of said video signal corresponds to a fixed amount of video data.

5. An information recording apparatus as set forth in claim 1, wherein said apparatus further comprises a two-bank memory and said input video signal is read alternately from respective memory banks of said two-bank memory on a frame-by-frame basis.

6. An information recording method for recording information on a disk type recording medium so as to facilitate variable speed reproduction of said information from said disk type recording medium, comprising the steps of:

encoding an input video signal representative of a plurality of video frames;

controlling said encoding such that groups of said video frames are encoded into respective fixed size data blocks, each one of said groups of video frames including a predetermined number of video frames; and recording each of said fixed size data blocks into a predetermined integer number of contiguous sectors of said recording medium, said predetermined number of sectors being set according to a level of compression of said video signal, whereby the respective first frames of said data blocks occur at a period equal to said predetermined number of sectors; and whereby said predetermined number of sectors is determined in accordance with a selected recording mode, and for said selected recording mode the number of said predetermined sectors allocated to each said video frame is constant.

7. An information recording method as set forth in claim 6, wherein said predetermined number of video frames is one frame.

8. An information recording method as set forth in claim 6, wherein said predetermined number of video frames is more than two frames.

9. An information recording method as set forth in claim 8, wherein the first frame of said video signal corresponds to a fixed amount of video data.

10. An information recording method as set forth in claim 6, further comprising the step of reading said input video signal alternately from respective memory banks of a two-bank memory on a frame-by-frame basis.

11. An information reproducing apparatus for performing variable speed reproduction of information from a disk type recording medium, comprising:

a reproducing unit operable to reproduce recorded data that has been recorded by encoding an input video signal representative of a plurality of video frames, controlling said encoding such that groups of said video frames are encoded into respective fixed size data blocks, each one of said groups of video frames including a predetermined number of video frames, and recording each of said fixed size data blocks into a predetermined integer number of contiguous sectors of said recording medium, said predetermined number of sectors being set according to a level of compression of said video signal, whereby the respective first frames of said data blocks occur at a period equal to said predetermined number of sectors; and whereby said predetermined number of sectors is determined in accordance with a selected recording mode, and for said selected recording mode the number of said predetermined sectors allocated to each said video frame is constant; and an output unit for outputting the reproduced data.

12. An information reproducing apparatus as set forth in claim 11, further comprising still/step means for reading out one of said plurality of video frames from said recording medium, saving the read video frame in a buffer and displaying the read video frame saved in said buffer.

13. An information reproducing apparatus as set forth in claim 11, further comprising variable-speed reproducing means for reading out one of said plurality of video frames from said recording medium, saving the read video frame in a buffer and repeatedly displaying the read video frame saved in said buffer so as to vary the playback speed.

14. An information reproducing apparatus as set forth in claim 13, wherein said variable-speed reproducing means includes a first setting means for setting the reproducing speed through a displayed control bar.

15. An information reproducing apparatus as set forth in claim 13, wherein said variable-speed reproducing means includes a second setting means for setting the cue/review speed through a displayed control bar.

16. An information reproducing apparatus as set forth in claim 11, further comprising variable-speed cue/review means for reading out an integer number of said plurality of video frames from said recording medium by reading out non-contiguous sectors of said medium and displaying the video frame data from the read sectors.

17. An information reproducing apparatus as set forth in claim 11, further comprising slow-search means for reading out one of said plurality of video frames from said recording medium, saving the read video frame in a buffer, repeatedly displaying the read video frame saved in said buffer and continuously varying the number of times the read video frame is repeatedly displayed.

18. An information reproducing apparatus as set forth in claim 11, further comprising fast-search means for reading out an integer number of said plurality of video frames from said recording medium by reading out non-contiguous sectors of said medium, displaying the video frame data from the read sectors and continuously varying the number of sectors skipped when reading out non-contiguous sectors of said medium.

19. An information reproducing apparatus as set forth in claim 11, wherein said apparatus is responsive to a first flag to switch on and off the muting of audio playback, and a second flag to switch still-video playback modes between a field-still mode and a frame-still mode, whereby said first flag and said second flag are included in said group of video frames.

20. An information reproducing method for performing variable speed reproduction of information from a disk type recording medium, comprising the steps of:

reproducing recorded data that has been recorded by encoding an input video signal representative of a plurality of video frames, controlling said encoding such that groups of said video frames are encoded into respective fixed size data blocks, each one of said groups of video frames including a predetermined number of video frames, and recording each of said fixed size data blocks into a predetermined integer number of contiguous sectors of said recording medium, said predetermined number of sectors being set according to a level of compression of said video signal, whereby the respective first frames of said data blocks occur at a period equal to said predetermined number of sectors; and whereby said predetermined number of sectors is determined in accordance with a selected recording mode, and for said selected recording mode the number of said predetermined sectors allocated to each said video frame is constant; and outputting the reproduced data.

* * * * *